US012260752B2

(12) United States Patent
Mochizuki et al.

(10) Patent No.: US 12,260,752 B2
(45) Date of Patent: Mar. 25, 2025

(54) COMMUNICATION SYSTEM, SERVER APPARATUS, PROGRAM AND COMMUNICATION METHOD

(71) Applicant: FURUKAWA ELECTRIC CO., LTD., Tokyo (JP)

(72) Inventors: Takahiro Mochizuki, Tokyo (JP); Kazutaka Shimoosako, Tokyo (JP); Takumi Matsumoto, Tokyo (JP); Hiroaki Rikihisa, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 157 days.

(21) Appl. No.: 18/004,825

(22) PCT Filed: Mar. 18, 2022

(86) PCT No.: PCT/JP2022/012567
§ 371 (c)(1),
(2) Date: Jan. 9, 2023

(87) PCT Pub. No.: WO2022/215493
PCT Pub. Date: Oct. 13, 2022

(65) Prior Publication Data
US 2023/0252892 A1    Aug. 10, 2023

(30) Foreign Application Priority Data
Apr. 7, 2021 (JP) .................. 2021-065266

(51) Int. Cl.
*G08G 1/087* (2006.01)
*G08G 1/09* (2006.01)
*H04W 72/56* (2023.01)

(52) U.S. Cl.
CPC .............. *G08G 1/087* (2013.01); *G08G 1/093* (2013.01); *H04W 72/56* (2023.01)

(58) Field of Classification Search
CPC ........ G08G 1/087; G08G 1/093; H04W 72/56
(Continued)

(56) References Cited

U.S. PATENT DOCUMENTS 10,735,988 B2 * 8/2020 Nagamura ............. G08G 1/164
10,885,780 B1 * 1/2021 Bseileh .................. G08G 1/087
(Continued)

FOREIGN PATENT DOCUMENTS

JP      2009-81563 A    4/2009
JP      6068785 B2      1/2017
(Continued)

OTHER PUBLICATIONS

International Search Report issued May 31, 2022 in PCT/JP2022/012567 filed Mar. 18, 2022, 2 pages.
(Continued)

*Primary Examiner* — Kerri L McNally
(74) *Attorney, Agent, or Firm* — Oblon, McClelland, Maier & Neustadt, L.L.P.

(57) ABSTRACT

The communication system in an embodiment includes a server apparatus. The server apparatus includes a controller that issues an instruction for executing priority control when a priority vehicle passes through a place where a roadside unit is installed. The priority control prioritizes a first communication performed by the priority vehicle via the roadside unit over a second communication performed by anything other than the priority vehicle via the roadside unit.

19 Claims, 11 Drawing Sheets

(58) Field of Classification Search
USPC .......................................................... 340/906
See application file for complete search history.

(56) References Cited

U.S. PATENT DOCUMENTS

| | | | |
|---|---|---|---|
| 2012/0163275 A1* | 6/2012 | Kim ................ | G08G 1/096716 |
| | | | 370/312 |
| 2017/0201461 A1 | 7/2017 | Cheng et al. | |
| 2017/0352268 A1 | 12/2017 | Colella et al. | |
| 2019/0244518 A1* | 8/2019 | Cheng ................. | G05D 1/0088 |
| 2019/0385448 A1* | 12/2019 | Montemurro ........ | G08G 1/0112 |
| 2020/0077407 A1* | 3/2020 | Srivastava .............. | H04W 4/08 |
| 2020/0275243 A1 | 8/2020 | Ueno et al. | |
| 2020/0401959 A1* | 12/2020 | Lee ........................ | G08G 1/202 |

FOREIGN PATENT DOCUMENTS

| | | |
|---|---|---|
| JP | 2021-33880 A | 3/2021 |
| WO | WO 2019/044208 A1 | 3/2019 |

OTHER PUBLICATIONS

Extended European Search Report Issued Nov. 17, 2023 in European Patent Application No. 22784478.4, 10 pages.
Rentao Gu et al., "Network slicing and efficient ONU migration for reliable communications in converged vehicular and fixed access network", Vehicular Communications, vol. 11, XP055480622, Jan. 31, 2018, pp. 57-67.

\* cited by examiner

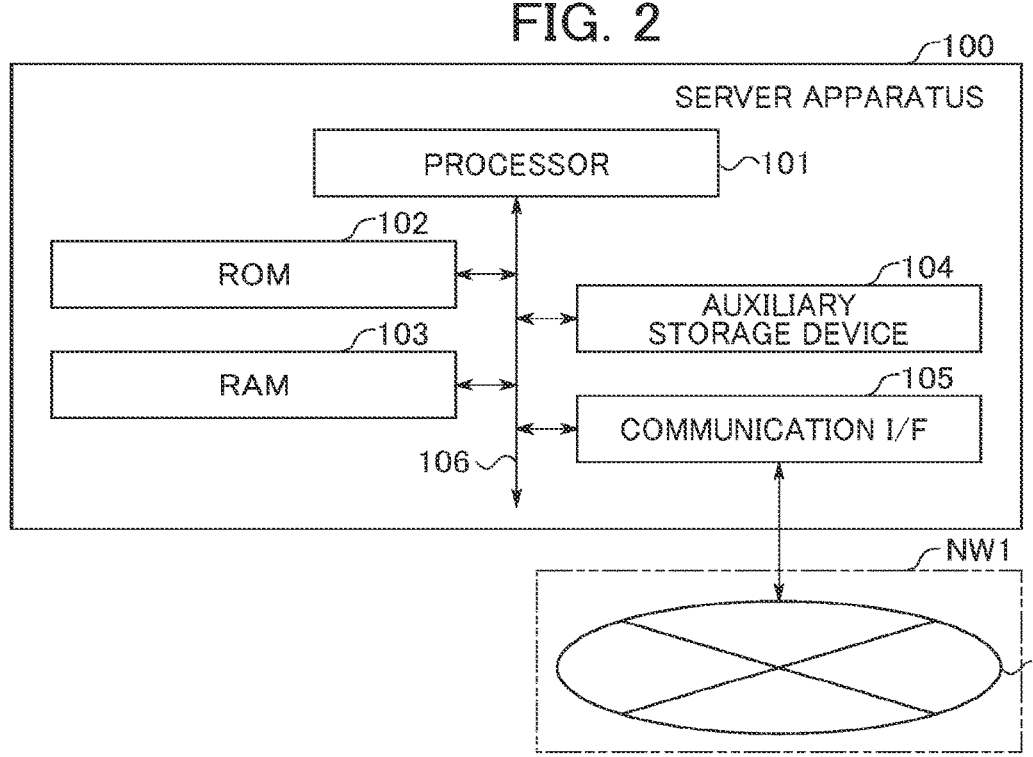
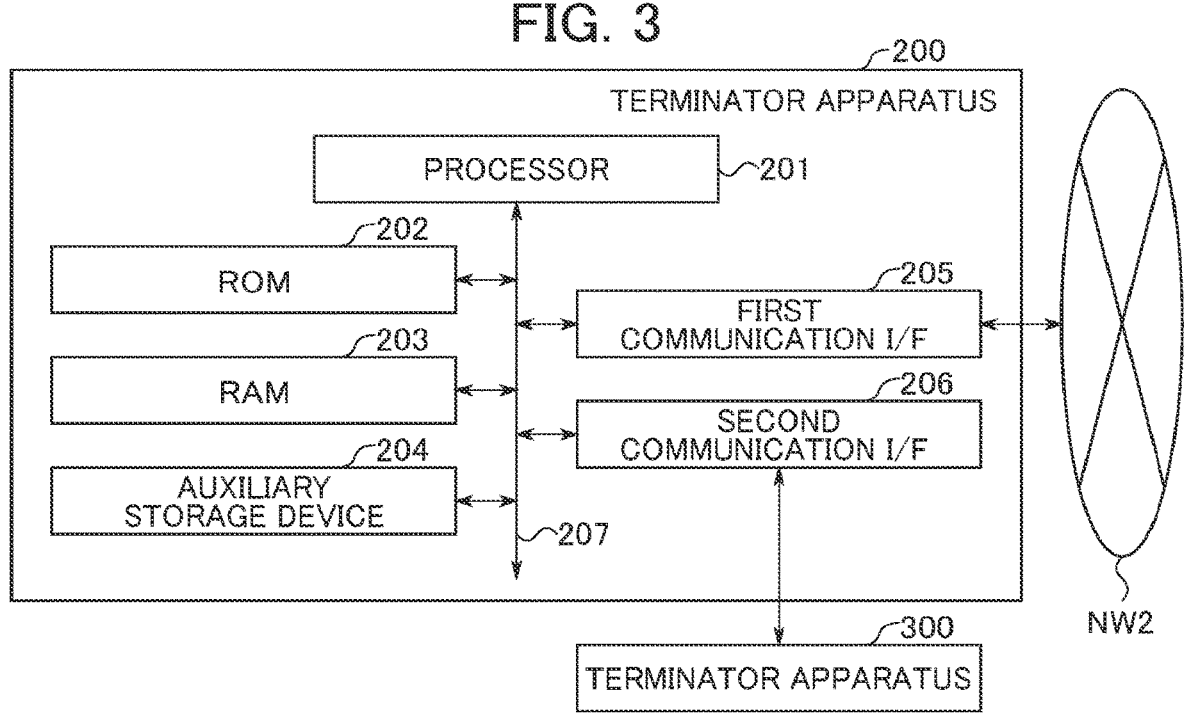

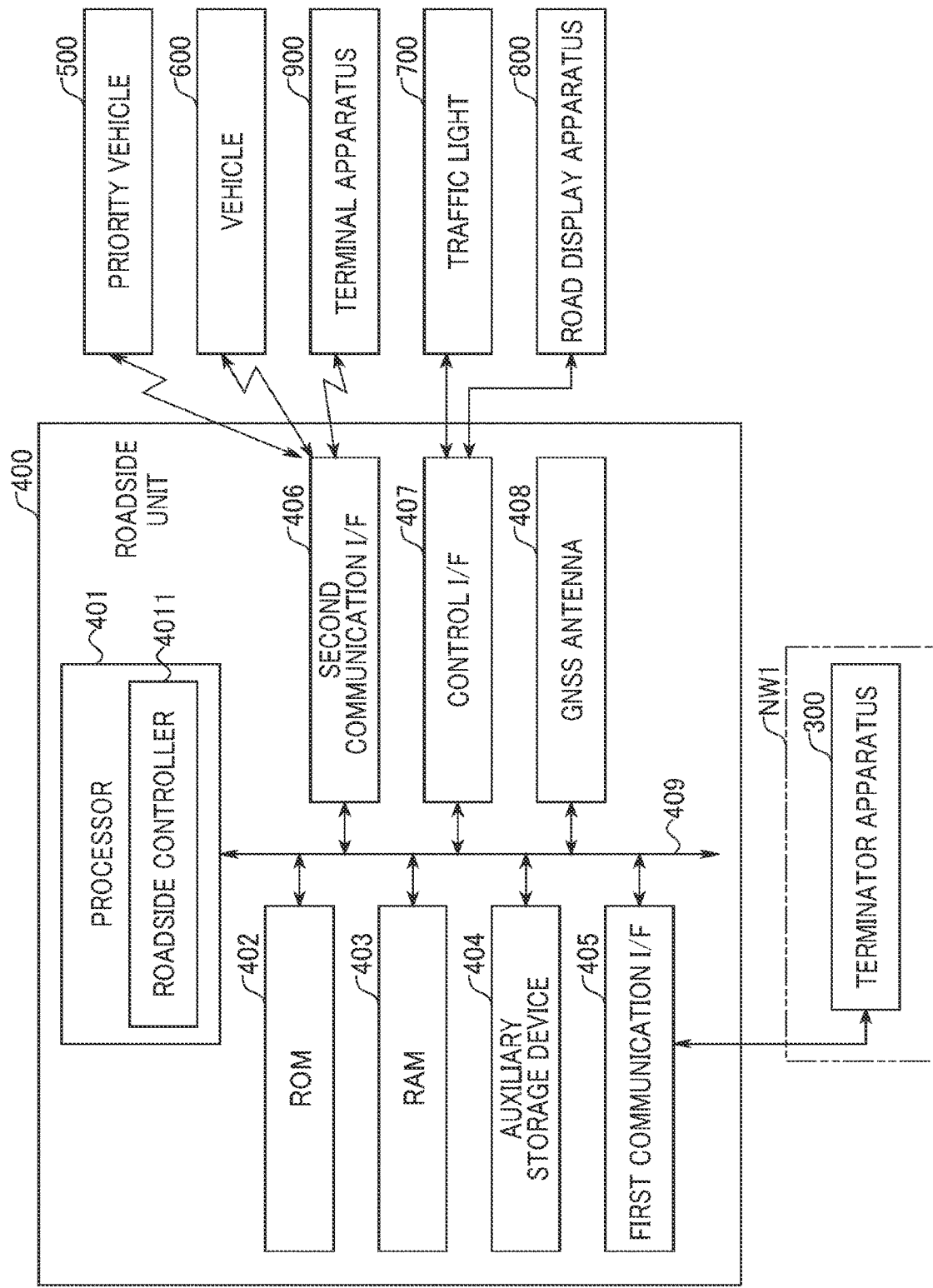

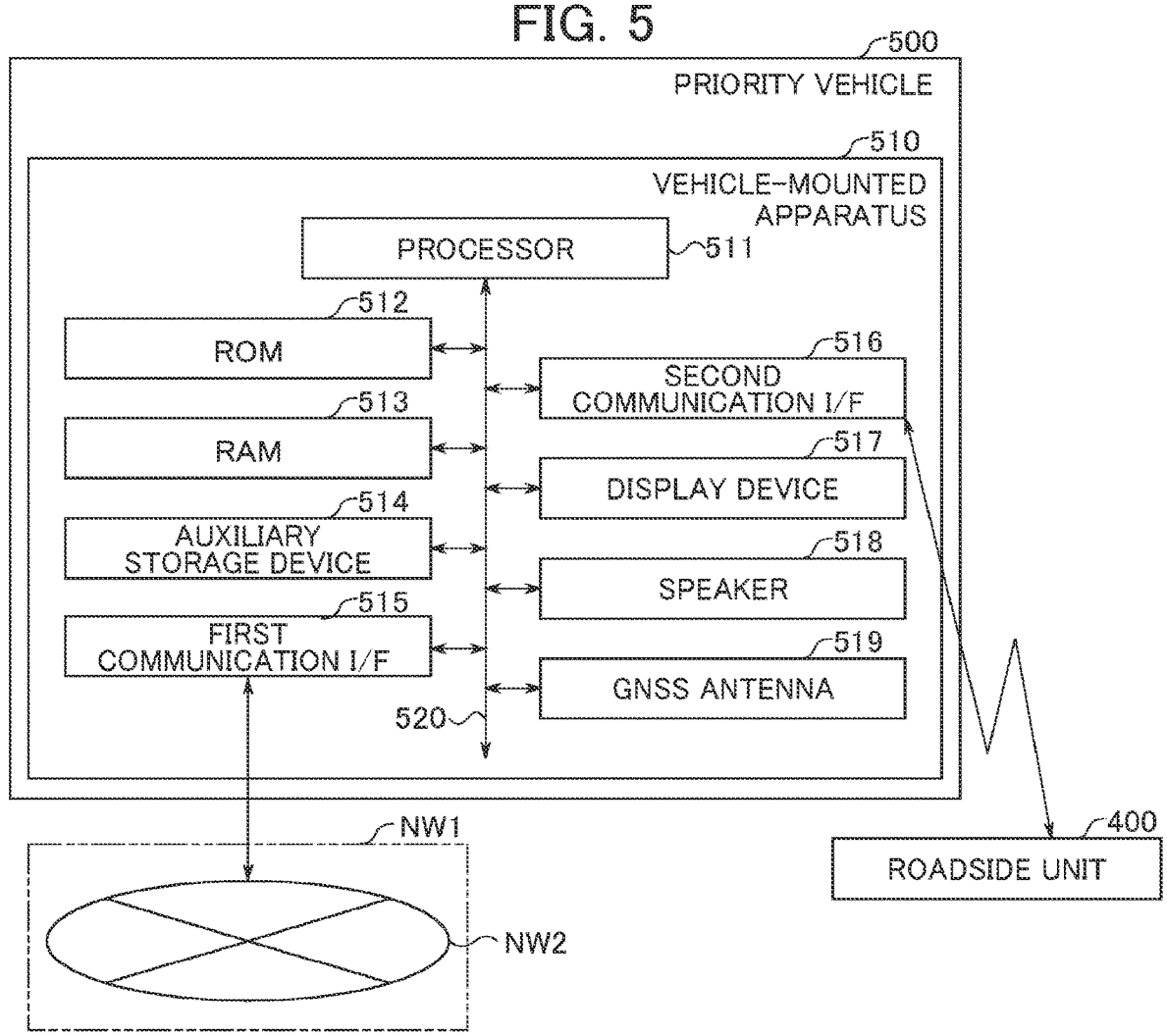

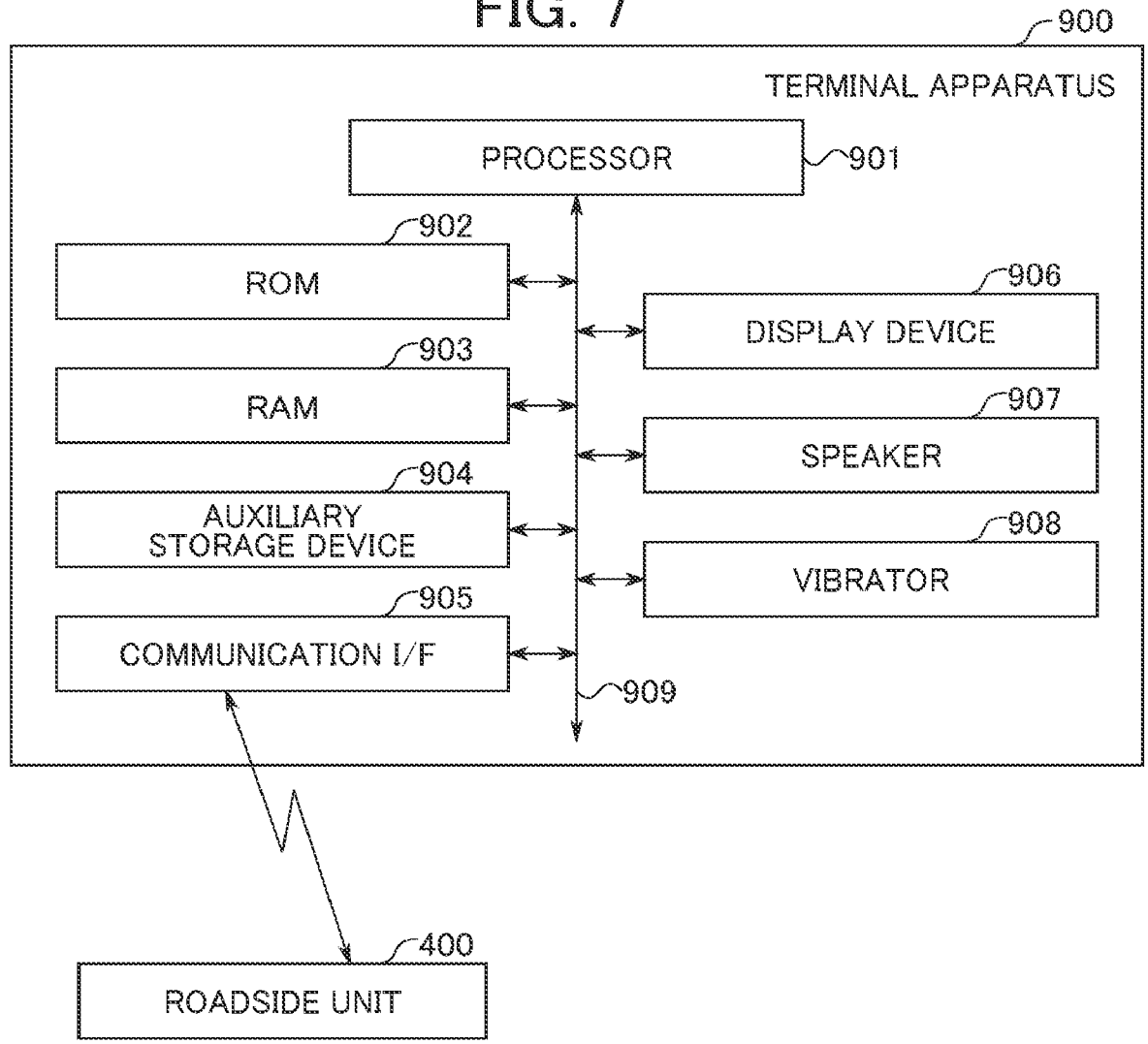

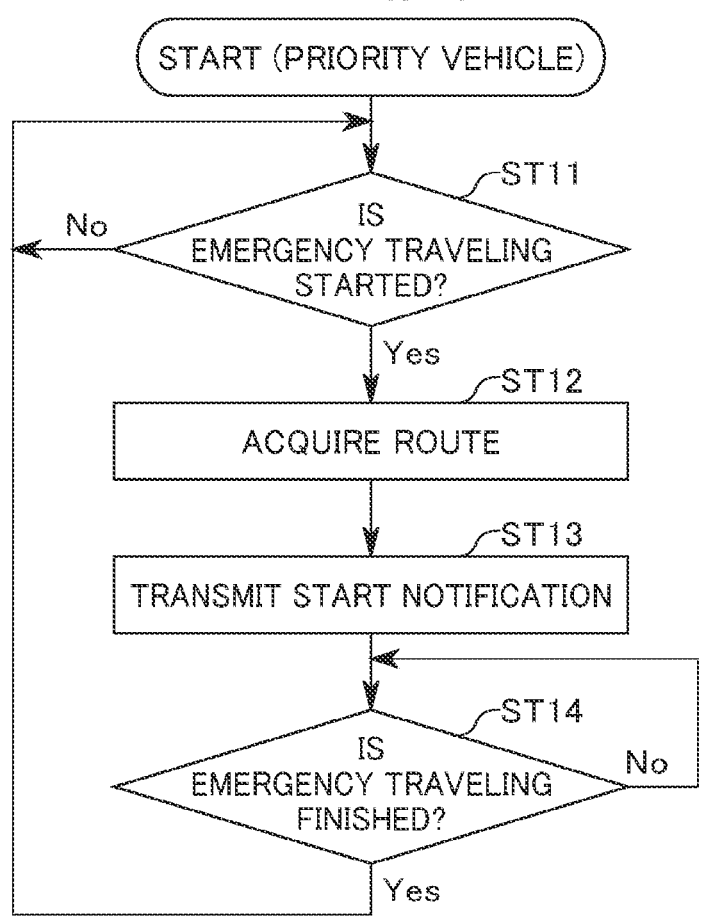

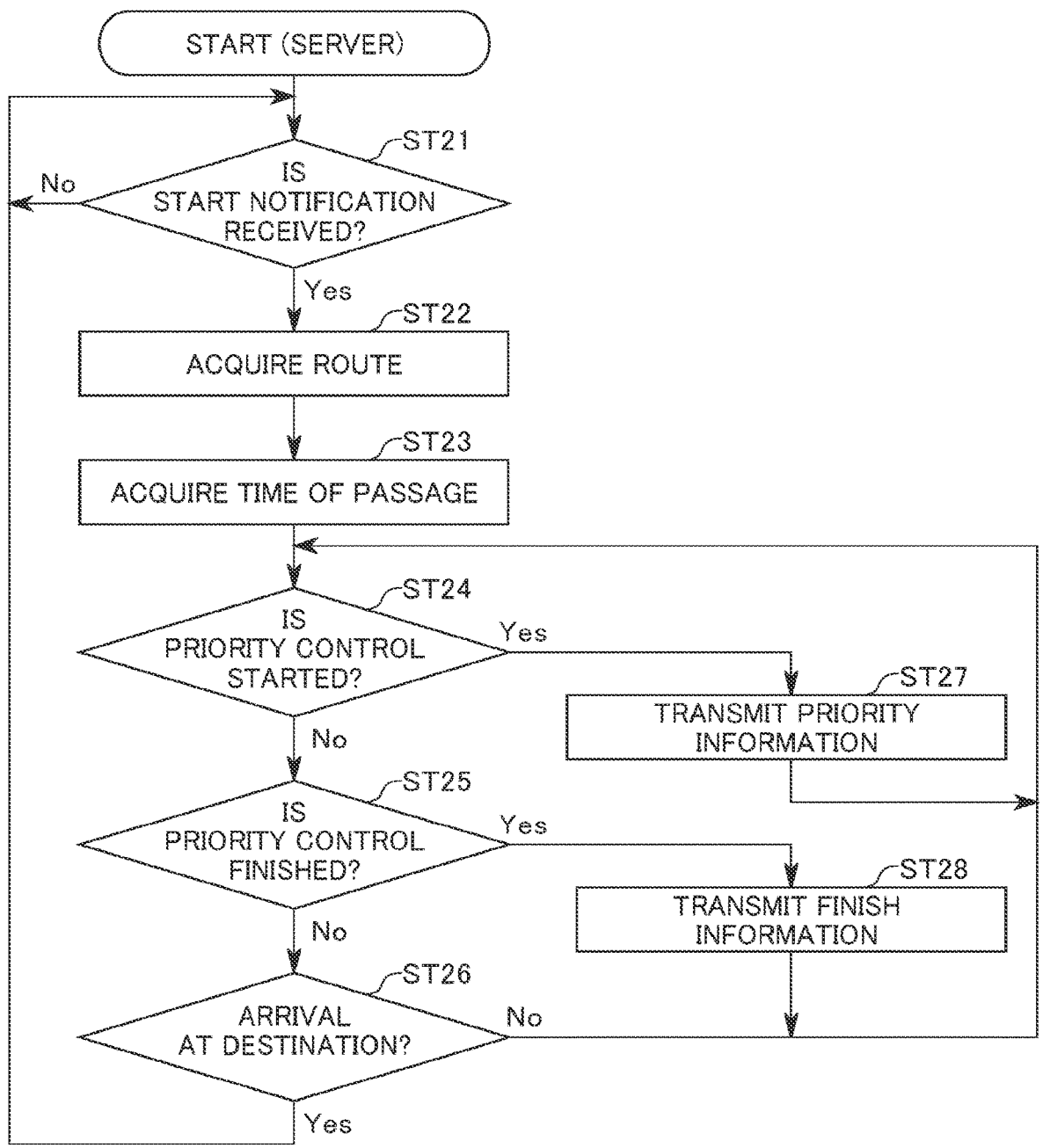

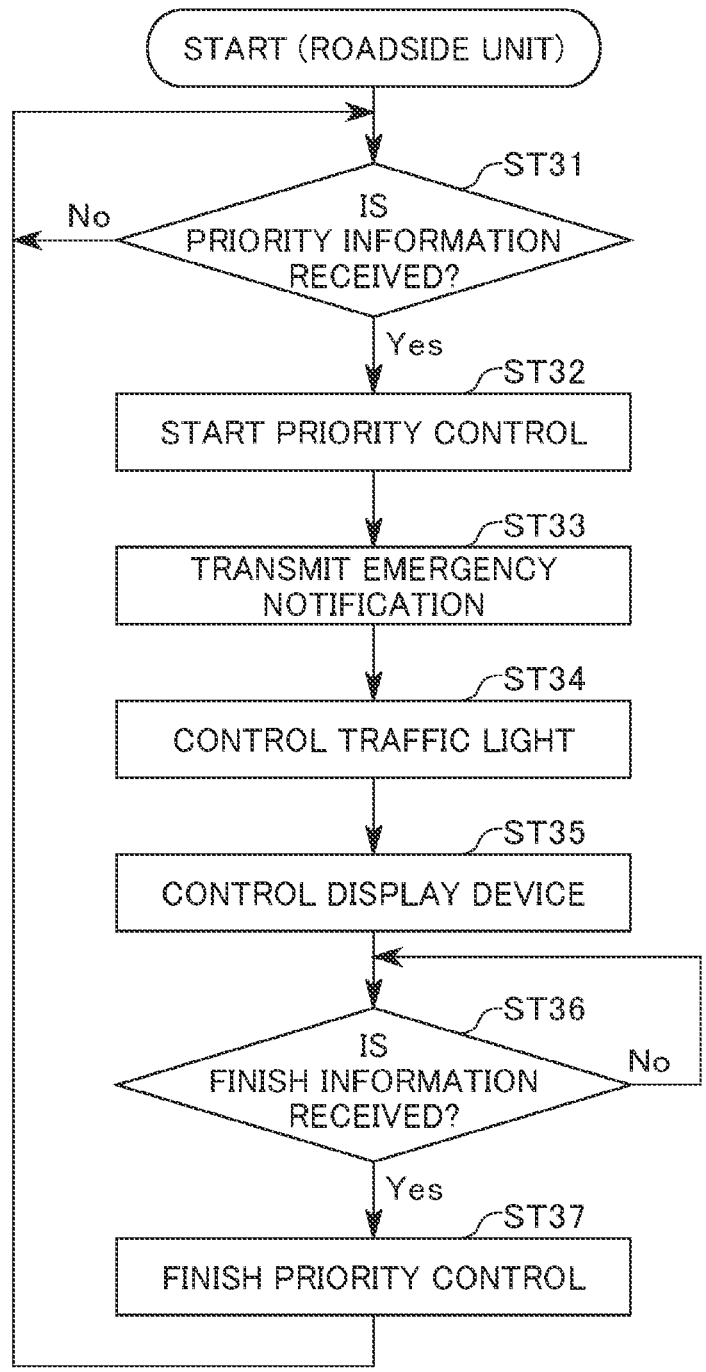

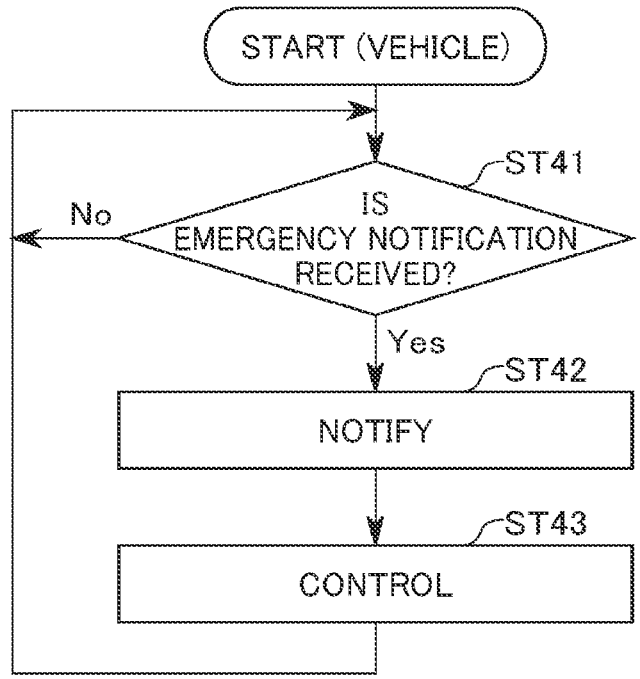
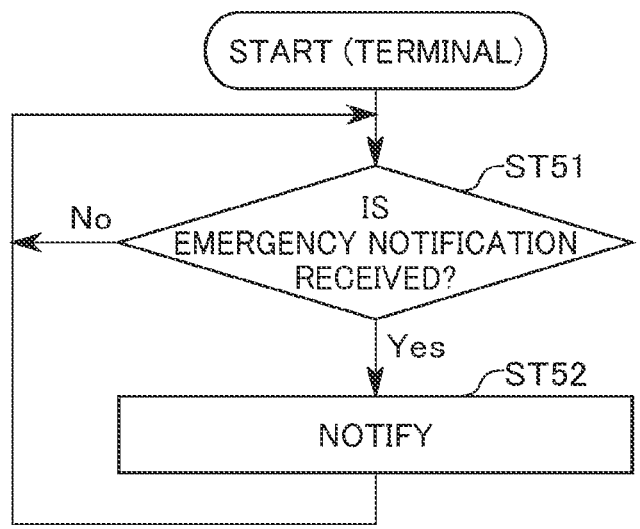

COMMUNICATION SYSTEM, SERVER APPARATUS, PROGRAM AND COMMUNICATION METHOD

TECHNICAL FIELD

The present invention relates to a communication system, a server apparatus, a program and a communication method.

BACKGROUND ART

There is V2X (vehicle-to-everything) communication, such as V2I (vehicle-to-infrastructure) and V2N (vehicle-to-network) allowing a vehicle to communicate via a roadside unit. A technology of allowing an emergency vehicle, such as an ambulance, to perform such a type of communication is disclosed, for example, in Patent Document 1.
Patent Document 1: Japanese Patent No. 6068785

DISCLOSURE OF THE INVENTION

Problems to be Solved by the Invention

Priority vehicles, such as emergency vehicles, sometimes transmit and receive information having a high priority, such as information having a high urgency. Accordingly, even with a factor, such as congestion, information having a high priority is required to be stably transmitted and received. The conventional art as described in Patent Document 1 has room for improvement in terms of stabilizing communication of emergency vehicles.

An object that embodiments of the present invention intend to solve is to provide a communication system, a server apparatus, a program and a communication method that are capable of providing a stable communication service for priority vehicles including emergency vehicles.

Means for Solving the Problems

The communication system in an embodiment includes a server apparatus. The server apparatus includes a controller that issues an instruction for executing priority control when a priority vehicle passes through a place where a roadside unit is installed, the priority control prioritizing a first communication performed by the priority vehicle via the roadside unit over a second communication performed by anything other than the priority vehicle via the roadside unit.

When the priority vehicle passes through the place, the controller may issue an instruction for executing the priority control to the roadside unit. Upon receipt of the instruction for executing the priority control from the server apparatus, the roadside unit may perform the priority control.

When the priority vehicle passes through the place, the controller may issue an instruction for executing the priority control to a priority-controllable communication network between the server apparatus and the roadside unit. Upon receipt of the instruction for executing the priority control from the server apparatus, the communication network may perform the priority control.

The communication network may include a PON access system that includes an OLT and an ONU.

The communication network may include a PON access system that includes a WAN communication network, an OLT and an ONU.

When the priority vehicle passes through the place, the roadside unit may transmit information indicating that the priority vehicle is approaching, to an apparatus around the roadside unit.

The controller may identify the roadside unit installed at the place where the priority vehicle passes, based on a route where the priority vehicle is scheduled to pass and on an installation position of the roadside unit, and control the identified roadside unit to perform the priority control.

The controller may issue an instruction for executing the priority control at a time a first predetermined time period before an estimated time at which the priority vehicle is estimated to pass through the place.

The controller may issue an instruction for finishing the priority control at a time a second predetermined time period after an estimated time at which the priority vehicle is estimated to pass through the place.

The controller may acquire the estimated time, based on a result of machine learning using past traveling data.

When a distance between the priority vehicle and the roadside unit becomes equal to or less than a first predetermined distance, the controller may issue an instruction for executing the priority control.

When the priority vehicle moves away from the roadside unit by a second predetermined distance or more, the roadside unit may issue an instruction for finishing the priority control.

When the priority vehicle passes around the roadside unit, the roadside unit may control a traffic light.

The roadside unit may cause a channel used for the first communication and a channel used for the second communication to be different channels, and perform the priority control by controlling communication on the channel used for the first communication to be prioritized.

A server apparatus in an embodiment includes a controller. The controller issues an instruction for executing priority control when a priority vehicle passes through a place where a roadside unit is installed, the priority control prioritizing a first communication performed by the priority vehicle via the roadside unit over a second communication performed by anything other than the priority vehicle via the roadside unit.

A program in an embodiment causes a processor included in a server apparatus to function as a controller. The controller issues an instruction for executing priority control when a priority vehicle passes through a place where a roadside unit is installed, the priority control prioritizing a first communication performed by the priority vehicle via the roadside unit over a second communication performed by anything other than the priority vehicle via the roadside unit.

A communication method in an embodiment issues an instruction for executing priority control when a priority vehicle passes around a roadside unit, the priority control prioritizing a first communication performed by the priority vehicle via the roadside unit over a second communication performed by anything other than the priority vehicle via the roadside unit.

Effects of the Invention

The present invention can provide a stable communication service for priority vehicles including emergency vehicles.

BRIEF DESCRIPTION OF THE DRAWINGS

FIG. 2 is a block diagram showing an example of a main part configuration of a server apparatus in FIG. 1;

FIG. 3 is a block diagram showing an example of a main part configuration of a terminator apparatus (OLT) in FIG. 1;

FIG. 4 is a block diagram showing an example of a main part configuration of a roadside unit in FIG. 1;

FIG. 5 is a block diagram showing an example of a main part configuration of a priority vehicle in FIG. 1;

FIG. 7 is a block diagram showing an example of a main part configuration of a terminal apparatus in FIG. 1;

FIG. 8 is a flowchart showing an example of processes by a processor of a vehicle-mounted apparatus in FIG. 5;

FIG. 9 is a flowchart showing an example of processes by a processor of the server apparatus in FIG. 2;

FIG. 10 is a flowchart showing an example of processes by a processor of the roadside unit in FIG. 4;

FIG. 11 is a flowchart showing an example of processes by a processor of a vehicle-mounted apparatus in FIG. 6;

FIG. 12 is a flowchart showing an example of processes by a processor of the terminal apparatus in FIG. 7.

PREFERRED MODE FOR CARRYING OUT THE INVENTION

Hereinafter, a communication system according to an embodiment is described with reference to the drawings. Note that in each drawing used in the following description of embodiments, the scale of each component is appropriately changed in some cases. Each drawing used in the following description of embodiments shows the configuration with some components being omitted for the sake of description. In each drawing and this specification, the same symbols denote similar elements.

Figure 1:
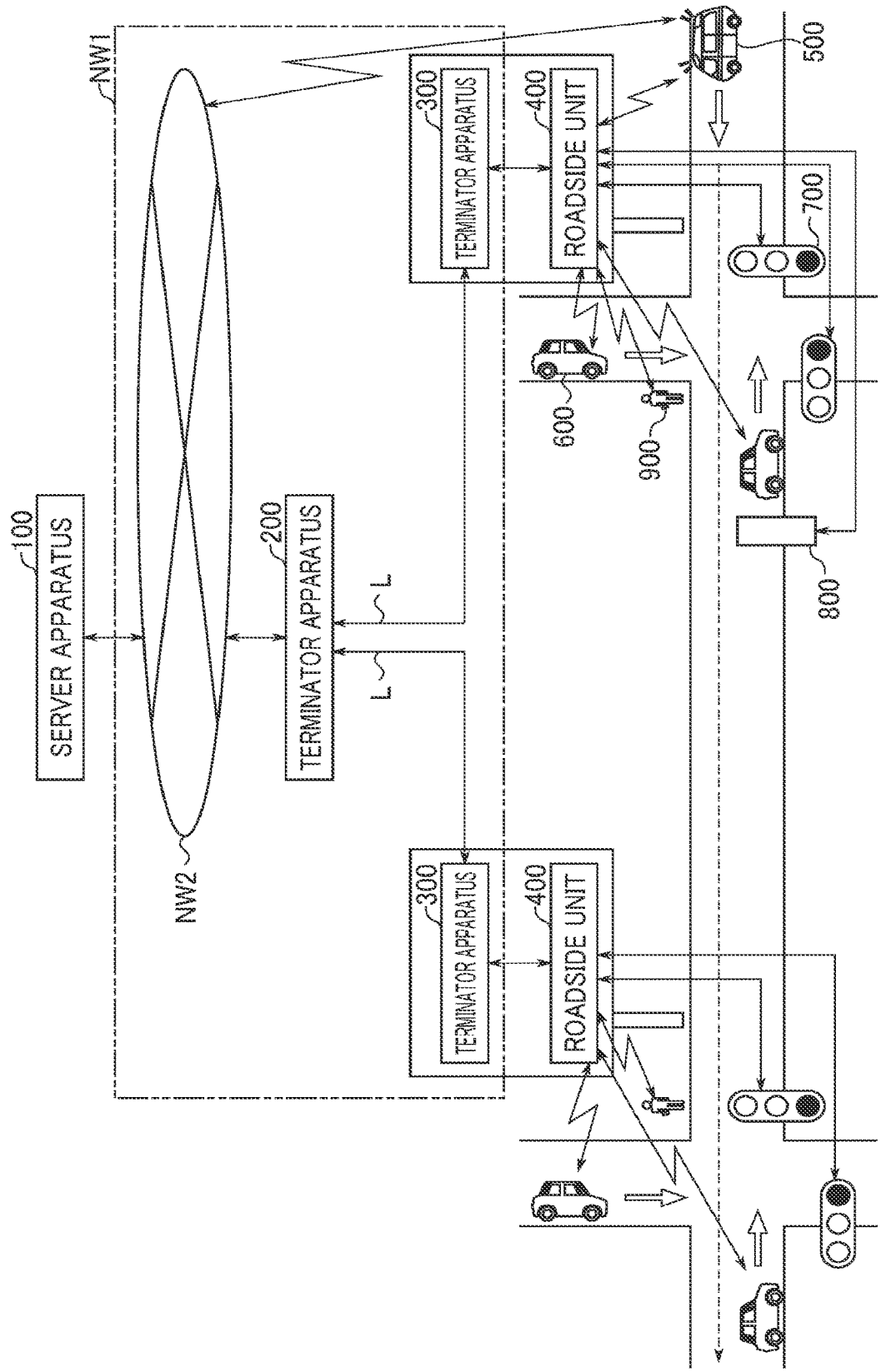
FIG. 1 shows an example of an overview of a communication system according to an embodiment.

FIG. 1 shows an example of an overview of the communication system 1 according to the embodiment. The communication system 1 includes, for example, a server apparatus 100, terminator apparatuses 200, terminator apparatuses 300, roadside units 400, priority vehicles 500, vehicles 600, traffic lights 700, road display apparatuses 800 and terminal apparatuses 900. Typically, each item is implemented as a plurality of entities such that the terminator apparatuses 200, terminator apparatuses 300, roadside units 400, priority vehicles 500, vehicles 600, traffic lights 700, road display apparatuses 800 and terminal apparatuses 900. The server apparatus 100 may be arranged around the terminator apparatus 200 or the terminator apparatus 300. The server apparatus 100 may have a configuration of edge computing or other in which a plurality of entities are arranged in a distributed manner.

When the priority vehicle 500 passes an intersection or the like installed with the roadside unit 400, the communication system 1 prioritizes communications by the priority vehicle 500 via the roadside unit 400 over those by another vehicle 600 and the like. The communication system 1 notifies the vehicle 600, pedestrians and the like around the roadside unit 400 that the priority vehicle 500 passes the intersection.

For example, the server apparatus 100, the terminator apparatus 200, the terminator apparatus 300, the roadside unit 400 and the priority vehicle 500 are connected to a communication network NW1. The communication network NW1 includes the terminator apparatus 200, the terminator apparatus 300, a communication network NW2 and a line L. Typically, the communication network NW1 is a communication network that includes the Internet. Typically, the communication network NW1 includes a WAN (wide area network) communication network, such as the communication network NW2. The communication network NW2 is, for example, an MPLS (Multiprotocol Label Switching) network. The server apparatus 100, the terminator apparatus 200 and the priority vehicle 500 are connected to the communication network NW2. The communication network NW1 may be a communication network that includes a private network, such as an intranet. The communication network NW1 may be a communication network that includes a LAN (local area network). The communication network NW1 includes, for example, a wireless line or a wired line. Parts of or the entire communication network NW1 is, for example, a priority-controllable communication network, such as a PON (passive optical network) access system using a PON. Note that the line L is described later. For example, the terminator apparatus 200, the terminator apparatus 300, the roadside unit 400 and network equipment in the communication network NW2 are priority-controllable equipment.

FIG. 2 is a block diagram showing an example of a main part configuration of the server apparatus 100. The server apparatus 100 performs control and the like for the roadside unit 400 and the like. The server apparatus 100 includes, for example, a processor 101, a ROM (read-only memory) 102, a RAM (random-access memory) 103, an auxiliary storage device 104 and a communication I/F (interface) 105. A bus 106 and the like connect these components to each other.

The processor 101 corresponds to a central part of a computer that performs processes, such as computation and control, required for operations of the server apparatus 100. The processor 101 may be, for example, a CPU (central processing unit), an MPU (micro processing unit), an SoC (system on a chip), a DSP (digital signal processor), a GPU (graphics processing unit), a VPU (vision processing unit), an ASIC (application specific integrated circuit), a PLD (programmable logic device), an FPGA (field-programmable gate array) or the like. Alternatively, the processor 101 may be a combination of multiplicity among them. The processor 101 controls each component to achieve various functions of the server apparatus 100, based on programs, such as firmware, system software and application software, stored in the ROM 102, the auxiliary storage device 104 or the like. The processor 101 executes processes described later, based on the programs. Note that some or all of the programs may be implemented in a circuit of the processor 101.

The ROM 102 and the RAM 103 correspond to a main storage device of the computer centered on the processor 101. The ROM 102 is a nonvolatile memory exclusively used for data reading. The ROM 102 stores, for example, the firmware or the like among the programs. The ROM 102 stores data and the like that the processor 101 uses when performing various processes. The RAM 103 is a memory used to write and read data. The RAM 103 is used as a work area and the like storing data that the processor 101 temporarily uses when performing various processes. Typically, the RAM 103 is a volatile memory.

The auxiliary storage device 104 corresponds to an auxiliary storage device of the computer centered on the processor 101. The auxiliary storage device 104 is, for example, an EEPROM (electric erasable programmable read-only memory), an HDD (hard disk drive) or a flash memory. The auxiliary storage device 104 stores, for example, the system software, the application software and the like among the programs described above. The auxiliary storage device 104 stores data that the processor 101 uses when performing various processes, data generated by processes by the processor 101, various setting values and the like. The auxiliary storage device 104 stores position information on each roadside unit 400.

The communication I/F 105 is an interface for allowing the server apparatus 100 to communicate via the communication network NW1 or the like.

The bus 106 includes a control bus, an address bus and a data bus and transfers signals transmitted and received between the components of the server apparatus 100.

The terminator apparatus 200 and the terminator apparatus 300 are connected by the line L. The line L is, for example, a communication line, such as an optical fiber. Typically, a plurality of terminator apparatuses 300 are connected to a single terminator apparatus 200.

FIG. 3 is a block diagram showing an example of a main part configuration of the terminator apparatus 200. The terminator apparatus 200 is, for example, an OLT (optical line terminal). The terminator apparatus 200 connects the line L and the communication network NW2 to each other. The terminator apparatus 200 includes, for example, a processor 201, a ROM 202, a RAM 203, an auxiliary storage device 204, a first communication I/F 205 and a second communication I/F 206. A bus 207 and the like connect these components to each other.

The processor 201 is a central part of a computer that performs processes, such as computation and control, required for operations of the terminator apparatus 200 and performs various computations and processes. The processor 201 is, for example, a CPU, an MPU, an SoC a DSP, a GPU, an ASIC a PLD, an FPGA or the like. Alternatively, the processor 201 may be a combination of multiplicity among them. The processor 201 controls each component to achieve various functions of the terminator apparatus 200, based on programs, such as firmware, system software and application software, stored in the ROM 202, the auxiliary storage device 204 or the like. The processor 201 executes processes described later, based on the programs. Note that some or all of the programs may be implemented in a circuit of the processor 201.

The ROM 202 and the RAM 203 are a main storage device of a computer centered on the processor 201. The ROM 202 is a nonvolatile memory exclusively used for data reading. The ROM 202 stores, for example, the firmware or the like among the programs. The ROM 202 stores data and the like that the processor 201 uses when performing various processes. The RAM 203 is a memory used to write and read data. The RAM 203 is used as a work area and the like storing data that the processor 201 temporarily uses when performing various processes. Typically, the RAM 203 is a volatile memory.

The auxiliary storage device 204 is an auxiliary storage device of the computer centered on the processor 201. The auxiliary storage device 204 is, for example, an EEPROM, an HDD, a flash memory or the like. The auxiliary storage device 204 stores, for example, the system software, the application software and the like among the programs described above. The auxiliary storage device 204 stores data that the processor 201 uses when performing various processes, data generated by processes by the processor 201, various setting values and the like.

The first communication I/F 205 is an interface for allowing the terminator apparatus 200 to communicate via the communication network NW2 or the like. The second communication I/F 206 is an interface for allowing the terminator apparatus 200 to communicate via the line L or the like. The terminator apparatus 200 connects the line L and the communication network NW2 to each other by the first communication I/F 205 and the second communication I/F 206.

The bus 207 includes a control bus, an address bus and a data bus and transfers signals transmitted and received between the components of the terminator apparatus 200.

The terminator apparatus 300 is, for example, an ONU (optical network unit). The terminator apparatus 300 connects the line L and the roadside unit 400 to each other. The communication system 1 includes, for example, one terminator apparatus 300 for one roadside unit 400. The communication system 1 includes, for example, one terminator apparatus 300 for a plurality of roadside units 400 in some cases.

FIG. 3 is a block diagram showing an example of a main part configuration of the roadside unit 400. The roadside unit 400 is also called an RSU (road side unit) or the like. The roadside unit 400 is an apparatus installed around a road or on the road. The roadside unit 400 is installed at, for example, an intersection or the like. The roadside unit 400 provides a V2X communication service, such as V2I and V2N, by communicating with the priority vehicle 500, the vehicle 600, etc. The roadside unit 400 has a function of controlling the traffic light 700, the road display apparatus 800 and the like. The roadside unit 400 includes, for example, a processor 401, a ROM 402, a RAM 403, an auxiliary storage device 404, a first communication I/F 405, a second communication I/F 406, a control I/F 407 and a GNSS antenna 408. A bus 409 and the like connect these components to each other.

The processor 401 corresponds to a central part of a computer that performs processes, such as computation and control, required for operations of the roadside unit 400. The processor 401 is, for example, a CPU, an MPU, an SoC a DSP, a GPU, a VPU, an ASIC a PLD, an FPGA or the like. Alternatively, the processor 401 may be a combination of multiplicity among them. The processor 401 controls each component to achieve various functions of the roadside unit 400, based on programs, such as firmware, system software and application software, stored in the ROM 402, the auxiliary storage device 404 or the like. The processor 401 executes processes described later, based on the programs. Note that some or all of the programs may be implemented in a circuit of the processor 401.

The ROM 402 and the RAM 403 correspond to a main storage device of the computer centered on the processor 401. The ROM 402 is a nonvolatile memory exclusively used for data reading. The ROM 402 stores, for example, the firmware or the like among the programs described above. The ROM 402 stores data and the like that the processor 401 uses when performing various processes. The RAM 403 is a memory used to write and read data. The RAM 403 is used as a work area and the like storing data that the processor 401 temporarily uses when performing various processes. Typically, the RAM 403 is a volatile memory.

The auxiliary storage device 404 corresponds to an auxiliary storage device of the computer centered on the processor 401. The auxiliary storage device 404 is, for example, an EEPROM, an HDD, a flash memory or the like. The auxiliary storage device 404 stores, for example, the system software, the application software and the like among the programs described above. The auxiliary storage device 404 stores data that the processor 401 uses when performing various processes, data generated by processes by the processor 401, various setting values and the like.

The first communication I/F 405 is an interface for allowing the roadside unit 400 to communicate via the communication network NW1. The roadside unit 400 is connected to and communicates with the terminator apparatus 300 via the first communication I/F 405. Accordingly, the roadside unit 400 is connected to the communication network NW2 via the first communication I/F 405, the terminator apparatus 300, the line L and the terminator apparatus 200. The roadside unit 400 may be connected to the communication network NW2 without the terminator apparatus 300. In this case, for example, the roadside unit 400 is connected to the communication network NW2 by wireless communication using 4G (fourth generation), 5G (fifth generation) or the like without the terminator apparatus 300.

The second communication I/F 406 is an interface for allowing the roadside unit 400 to perform V2X communications with apparatuses around the roadside unit 400. The roadside unit 400 communicates with the priority vehicle 500, the vehicle 600, the terminal apparatus 900 and the like via the second communication I/F 406.

The control I/F 407 is an interface for allowing the roadside unit 400 to communicate with each of the apparatuses, such as the traffic light 700 and the road display apparatus 800. The roadside unit 400 controls each apparatus via the control I/F 407. Note that communications via the control I/F 407 may be wired communications or wireless communications.

The GNSS antenna 408 receives a GNSS signal and the like. The GNSS signal is transmitted from navigation satellites or the like that constitute a GNSS, such as a GPS (Global Positioning System) or a quasi-zenith satellite system. The processor 401 acquires position information on the roadside unit 400, based on the GNSS signal or the like. The processor 401 then instructs the first communication I/F 405 to transmit the position information to the server apparatus 100. Upon receipt of the instruction for transmission, the first communication I/F 405 transmits the position information to the server apparatus 100. The transmitted position information is received by the communication I/F 105 of the server apparatus 100. The processor 101 of the server apparatus 100 stores the received position information in the auxiliary storage device 104. The processor 401 also performs time adjustment using the GNSS signal. Alternatively, the processor 401 may perform time adjustment by another method, such as use of an NTP (network time protocol).

The bus 409 includes a control bus, an address bus and a data bus and transfers signals transmitted and received between the components of the roadside unit 400.

FIG. 5 is a block diagram showing an example of a main part configuration of the priority vehicle 500. The priority vehicle 500 is, for example, any of emergency vehicles (emergency automobiles), such as an ambulance (ambulance automobile), a fire engine (automobile for extinguishing fire) and a police car, a VIP (very important person) vehicle that accommodates important people, a premium service vehicle where communications for business or entertainment use are prioritized and other vehicles prioritized in terms of communications for various use cases, over the other vehicles. The priority vehicle 500 includes, for example, a vehicle-mounted apparatus 510.

The vehicle-mounted apparatus 510 has, for example, a function of using car navigation, ITS (intelligent transportation system), V2X communications, etc. The vehicle-mounted apparatus 510 includes, for example, a processor 511, a ROM 512, a RAM 513, an auxiliary storage device 514, a first communication I/F 515, a second communication I/F 516, a display device 517, a speaker 518 and a GNSS antenna 519. A bus 520 and the like connect these components.

The processor 511 corresponds to a central part of a computer that performs processes, such as computation and control, required for operations of the priority vehicle 500. The processor 511 is, for example, a CPU, an MPU, an SoC a DSP, a GPU, an ASIC a PLD, an FPGA or the like. Alternatively, the processor 511 may be a combination of multiplicity among them. The processor 511 controls each component to achieve various functions of the priority vehicle 500, based on programs, such as firmware, system software and application software, stored in the ROM 512, the auxiliary storage device 514 or the like. The processor 511 executes processes described later, based on the programs. Note that some or all of the programs may be implemented in a circuit of the processor 511.

The ROM 512 and the RAM 513 correspond to a main storage device of the computer centered on the processor 511. The ROM 512 is a nonvolatile memory exclusively used for data reading. The ROM 512 stores, for example, the firmware or the like among the programs. The ROM 512 stores data and the like that the processor 511 uses when performing various processes. The RAM 513 is a memory used to write and read data. The RAM 513 is used as a work area and the like storing data that the processor 511 temporarily uses when performing various processes. Typically, the RAM 513 is a volatile memory.

The auxiliary storage device 514 corresponds to an auxiliary storage device of the computer centered on the processor 511. The auxiliary storage device 514 is, for example, an EEPROM, an HDD, a flash memory or the like. The auxiliary storage device 514 stores, for example, the system software, the application software and the like among the programs described above. The auxiliary storage device 514 stores data that the processor 511 uses when performing various processes, data generated by processes by the processor 511, various setting values and the like.

The first communication I/F 515 is an interface for allowing the priority vehicle 500 to communicate via the communication network NW2 or the like. The priority vehicle 500 is connected to the communication network NW2 by 4G, 5G or other wireless communication, for example.

The second communication I/F 516 is an interface for allowing the priority vehicle 500 to communicate with the roadside unit 400 and the like by V2X communications or the like. The priority vehicle 500 is connected to the communication network NW1 via the roadside unit 400.

The display device 517 displays a screen for notifying various types of information to an operator of the priority vehicle 500. The display device 517 is a display, for example, a liquid crystal display, an organic EL (electroluminescence) display or the like. The speaker 518 outputs an input sound signal as acoustic waves.

The GNSS antenna 519 receives a GNSS signal and the like. The processor 511 acquires position information on the vehicle-mounted apparatus 510, based on the GNSS signal or the like.

The bus 520 includes a control bus, an address bus and a data bus and transfers signals transmitted and received between the components of the vehicle-mounted apparatus 510.

Figure 6:
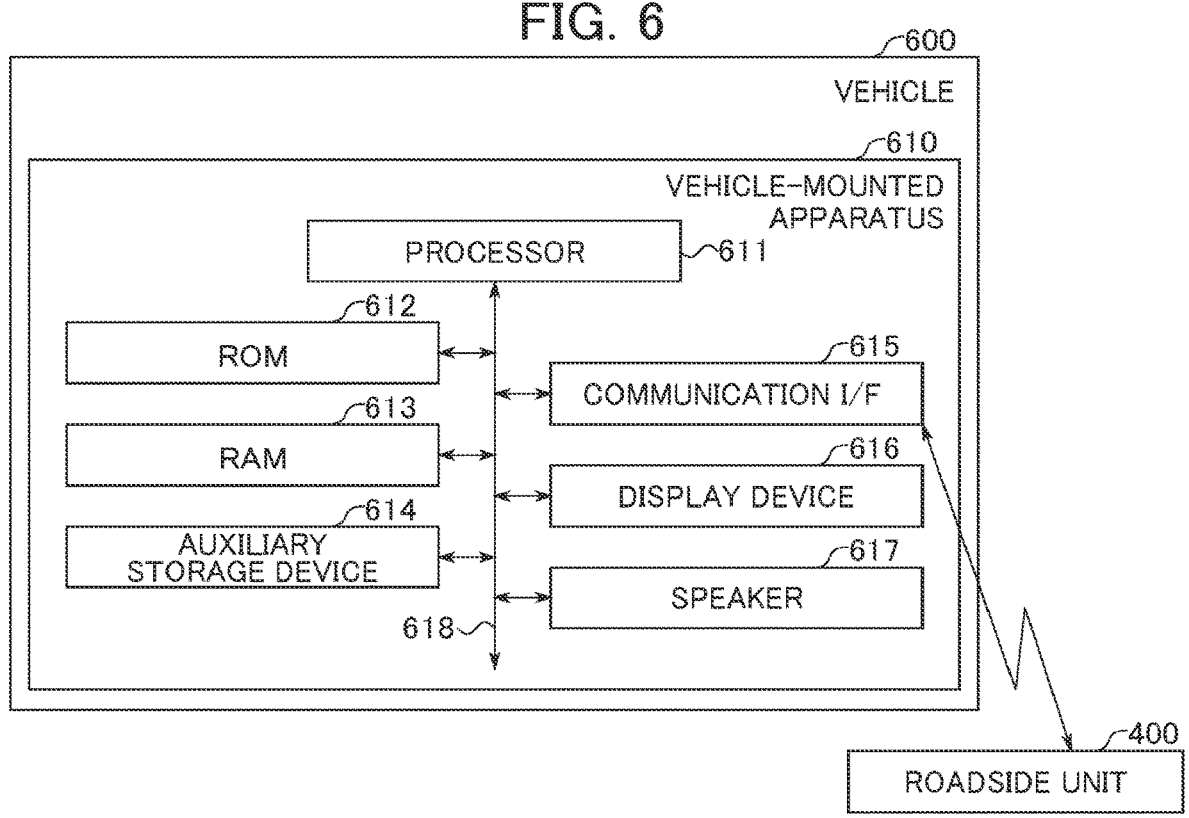
FIG. 6 is a block diagram showing an example of a main part configuration of a vehicle in FIG. 1.

FIG. 6 is a block diagram showing an example of a main part configuration of the vehicle 600. The vehicle 600 is, for example, a vehicle other than the priority vehicle. Even the priority vehicle serves as a vehicle 600 except in situations where it should be prioritized, such as during emergency traveling. The vehicle 600 includes, for example, a vehicle-mounted apparatus 610.

The vehicle-mounted apparatus 610 has, for example, a function of using car navigation, ITS and V2X communications, etc. The vehicle-mounted apparatus 610 includes, for example, a processor 611, a ROM 612, a RAM 613, an auxiliary storage device 614, a communication I/F 615, a display device 616 and a speaker 617. A bus 618 and the like connect these components to each other.

The processor 611 corresponds to a central part of a computer that performs processes, such as computation and control, required for operations of the vehicle-mounted apparatus 610. The processor 611 is, for example, a CPU, an MPU, an SoC a DSP, a GPU, an ASIC a PLD, an FPGA or the like. Alternatively, the processor 611 may be a combination of multiplicity among them. The processor 611 controls each component to achieve various functions of the vehicle-mounted apparatus 610, based on programs, such as firmware, system software and application software, stored in the ROM 612, the auxiliary storage device 614 or the like. The processor 611 executes processes described later, based on the programs. Note that some or all of the programs may be implemented in a circuit of the processor 611.

The ROM 612 and the RAM 613 correspond to a main storage device of the computer centered on the processor 611. The ROM 612 is a nonvolatile memory exclusively used for data reading. The ROM 612 stores, for example, the firmware or the like among the programs. The ROM 612 stores data and the like that the processor 611 uses when performing various processes. The RAM 613 is a memory used to write and read data. The RAM 613 is used as a work area and the like storing data that the processor 611 temporarily uses when performing various processes. Typically, the RAM 613 is a volatile memory.

The auxiliary storage device 614 corresponds to an auxiliary storage device of the computer centered on the processor 611. The auxiliary storage device 614 is, for example, an EEPROM, an HDD, a flash memory or the like. The auxiliary storage device 614 stores, for example, the system software, the application software and the like among the programs described above. The auxiliary storage device 614 stores data that the processor 611 uses when performing various processes, data generated by processes by the processor 611, various setting values and the like.

The communication I/F 615 is an interface for allowing the vehicle 600 to communicate with the roadside unit 400 by V2X communications or the like. The vehicle 600 is connected to the communication network NW1 via the roadside unit 400.

The display device 616 displays a screen for notifying various types of information to an operator of the vehicle 600. The display device 616 is a display, for example, a liquid crystal display, an organic EL display or the like. The speaker 617 outputs an input sound signal as acoustic waves.

The bus 618 includes a control bus, an address bus and a data bus and transfers signals transmitted and received between the components of the vehicle-mounted apparatus 610.

The traffic light 700 is a traffic light for traffic control at an intersection of roads or the like, for example.

The road display apparatus 800 is an apparatus that displays information and the like about road traffic, such as traffic jam information, on a display, such as a liquid crystal display or an LED (light-emitting diode) display.

FIG. 7 is a block diagram showing an example of a main part configuration of the terminal apparatus 900. The terminal apparatus 900 is an apparatus carried by a pedestrian or the like, for example. The terminal apparatus 900 is, for example, a mobile phone, such as a smartphone, a note PC (personal computer), a tablet device or the like. The terminal apparatus 900 includes, for example, a processor 901, a ROM 902, a RAM 903, an auxiliary storage device 904, a communication I/F 905, a touchscreen 906, a speaker 907 and a vibrator 908. A bus 909 and the like connect these components.

The processor 901 corresponds to a central part of a computer that performs processes, such as computation and control, required for operations of the terminal apparatus 900. The processor 901 is, for example, a CPU, an MPU, an SoC a DSP, a GPU, an ASIC a PLD, an FPGA or the like. Alternatively, the processor 901 may be a combination of multiplicity among them. The processor 901 controls each component to achieve various functions of the terminal apparatus 900, based on programs, such as firmware, system software and application software, stored in the ROM 902, the auxiliary storage device 904 or the like. The processor 901 executes processes described later, based on the programs. Note that some or all of the programs may be implemented in a circuit of the processor 901.

The ROM 902 and the RAM 903 correspond to a main storage device of the computer centered on the processor 901. The ROM 902 is a nonvolatile memory exclusively used for data reading. The ROM 902 stores, for example, the firmware or the like among the programs. The ROM 902 stores data and the like that the processor 901 uses when performing various processes. The RAM 903 is a memory used to write and read data. The RAM 903 is used as a work area and the like storing data that the processor 901 temporarily uses when performing various processes. Typically, the RAM 903 is a volatile memory.

The auxiliary storage device 904 corresponds to an auxiliary storage device of the computer centered on the processor 901. The auxiliary storage device 904 is, for example, an EEPROM, an HDD, a flash memory or the like. The auxiliary storage device 904 stores, for example, the system software, the application software and the like among the programs described above. The auxiliary storage device 904 stores data that the processor 901 uses when performing various processes, data generated by processes by the processor 901, various setting values and the like.

The communication I/F 905 is an interface for allowing the terminal apparatus 900 to communicate via the communication network NW1 or the like. The terminal apparatus is connected to the communication network NW1 via the roadside unit 400, for example.

The touchscreen 906 includes, for example, a display, such as a liquid crystal display or an organic EL display, and a pointing device through touch input, which are stacked together. The display included in the touchscreen 906 has a function as a display device that displays a screen for notifying various types of information to an operator of the terminal apparatus 900. The touchscreen 906 also functions as an input device that accepts a touch operation by the operator.

The speaker 907 outputs an input sound signal as acoustic waves. The vibrator 908 operates to thereby vibrate the terminal apparatus 900.

The bus 909 includes a control bus, an address bus and a data bus and transfers signals transmitted and received between the components of the terminal apparatus 900.

Figure 13:
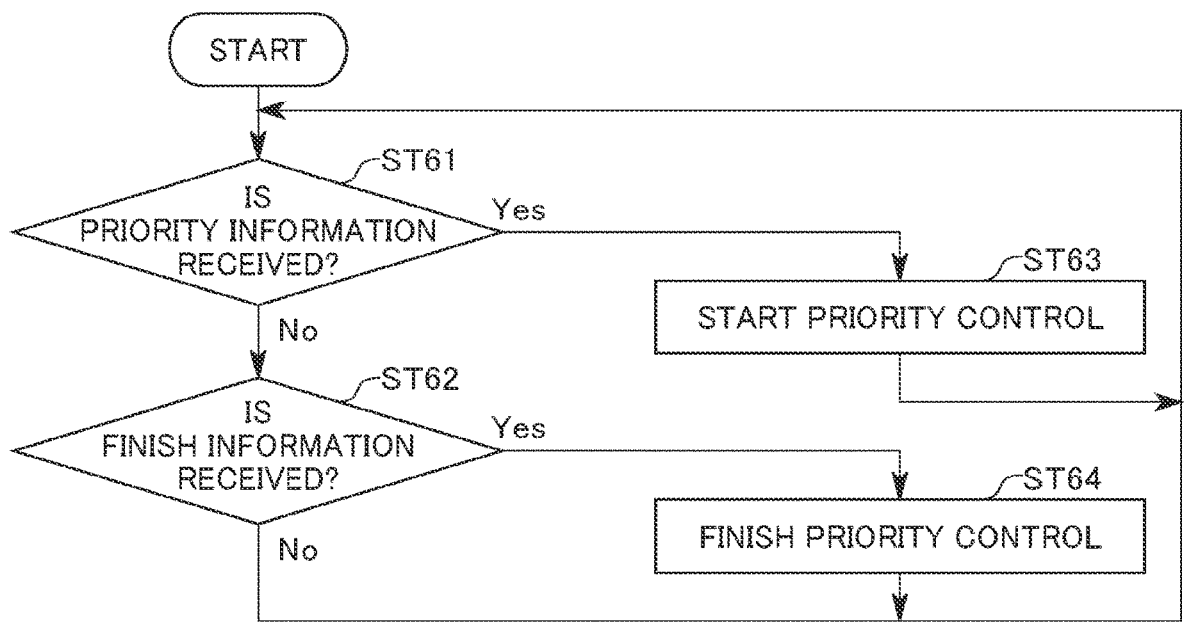
FIG. 13 is a flowchart showing an example of processes by a processor of the terminator apparatus in FIG. 3.

Hereinafter, the operation of the communication system 1 according to the embodiment is described based on FIGS. 8 to 12 and the like. Note that the details of the processes in the following description of operations is an example. Various processes that can acquire a similar result can be appropriately used. FIG. 8 is a flowchart showing an example of processes by the processor 511 of the vehicle-mounted apparatus 510. The processor 511 executes processes in FIG. 8, based on the program stored in the ROM 512, the auxiliary storage device 514 or the like, for example. FIG. 9 is a flowchart showing an example of processes by the processor 101 of the server apparatus 100. The processor 101 executes processes in FIG. 9, based on the program stored in the ROM 102, the auxiliary storage device 104 or the like, for example. FIG. 10 is a flowchart showing an example of processes by the processor 401 of the roadside unit 400. The processor 401 executes processes in FIG. 10, based on the program stored in the ROM 402, the auxiliary storage device 404 or the like, for example. FIG. 11 is a flowchart showing an example of processes by the processor 611 of the vehicle-mounted apparatus 610. The processor 611 executes processes in FIG. 11, based on the program stored in the ROM 612, the auxiliary storage device 614 or the like, for example. FIG. 12 is a flowchart showing an example of processes by the processor 901 of the terminal apparatus 900. The processor 901 executes processes in FIG. 12, based on the program stored in the ROM 902, the auxiliary storage device 904 or the like, for example. FIG. 13 is a flowchart showing an example of processes by the processor 201 of the terminator apparatus 200. The processor 201 executes processes in FIG. 13, based on the program stored in the ROM 202, the auxiliary storage device 204 or the like, for example.

In step ST11 of FIG. 8, the processor 511 of the vehicle-mounted apparatus 510 determines whether to start emergency traveling or not. For example, in response to an operation for starting emergency traveling performed for the priority vehicle 500, the processor 511 determines to start the emergency traveling. Alternatively, the processor 511 determines to start emergency traveling, based on information transmitted from a facility, such as a fire station, that issues an instruction to the priority vehicle 500. If the processor 511 does not determine to start emergency traveling, the processor 511 determines No in step ST11 and repeats step ST11. On the other hand, if the processor 511 determines to start emergency traveling, the processor 511 determines Yes in step ST11 and proceeds the processing to step ST12.

In step ST12, the processor 511 acquires a travel route that is a scheduled route for travel from the start position of emergency traveling to a destination. For example, the processor 511 acquires the travel route by determining the travel route by a method similar to publicly known car navigation or the like. For example, the processor 511 determines the travel route so as to reduce the time period required from the start position of emergency traveling to arrival at the destination. For example, the processor 511 adopts the route minimizing the time period as the travel route. For example, the processor 511 determines, as the travel route, the route that reduces the time period and passes through a road installed with the roadside unit 400 capable of executing priority control and emergency notification. For example, if there is a route passing through roads installed with the roadside units 400 more times than the route with the minimum time period among routes with a time period in a range that is predetermined time period longer than the minimum time period, the processor 511 determines, as the travel route, the route passing through roads installed with the roadside units 400 more times. Note that the priority control and emergency notification are described later. The processor 511 may periodically re-acquire the travel route depending on the latest current position of the priority vehicle 500. Alternatively, the processor 511 may acquire the travel route determined by the server apparatus 100.

In step ST13, the processor 511 instructs the first communication I/F 515 to transmit a start notification to the server apparatus 100. The start notification is information on notification about start of emergency traveling to the server apparatus 100. The start notification includes information indicating the start position and the destination of the emergency traveling and identification information for identifying the priority vehicle 500. The start position of emergency traveling is the current position of the priority vehicle 500, for example. The start notification may include information indicating the travel route acquired in step ST12. Upon receipt of the instruction for transmission, the first communication I/F 515 transmits the start notification to the server apparatus 100. The transmitted start notification is received by the communication I/F 105 of the server apparatus 100. Alternatively, the facility, such as a fire station, that issues an instruction to the priority vehicle 500 may transmit the start notification to the server apparatus 100.

In step ST14, the processor 511 determines whether to finish emergency traveling or not. For example, the processor 511 determines to finish the emergency traveling in response to arrival of the priority vehicle 500 at the destination. Alternatively, in response to an operation for finishing emergency traveling performed for the priority vehicle 500, the processor 511 determines to finish the emergency traveling. Alternatively, the processor 511 determines to finish the emergency traveling, based on information transmitted from the facility that issues an instruction to the priority vehicle 500. If the processor 511 does not determine to finish the emergency traveling, the processor 511 determines No in step ST14 and repeats the process of step ST14. On the other hand, if the processor 511 determines to finish the emergency traveling, the processor 511 determines Yes in step ST14 and returns the processing to step ST11.

On the other hand, in step ST21 of FIG. 9, the processor 101 of the server apparatus 100 waits for reception of the start notification by the communication I/F 105. Upon receipt of the start notification, the processor 101 determines Yes in step ST21 and proceeds the processing to step ST22.

In step ST22, the processor 101 acquires the travel route of the priority vehicle 500 from the start position to the destination. For example, the processor 101 acquires the travel route by a method similar to that of the vehicle-mounted apparatus 510. Alternatively, the processor 101 may acquire, from the priority vehicle 500, the travel route determined by the processor 511 of the vehicle-mounted apparatus 510 or the like. The travel route in this case is included in the start notification, for example. Note that the processor 101 may periodically acquire again the travel route depending on the latest current position of the priority vehicle 500. The processor 101 acquires the current position of the priority vehicle 500 from the vehicle-mounted apparatus 510, for example. The vehicle-mounted apparatus 510 acquires the own position by GNSS or the like. Alternatively, the processor 101 acquires the current position of the priority vehicle 500 from the roadside unit 400 or the like. The roadside unit 400 can detect that the priority vehicle 500 approaches. Accordingly, the roadside unit 400 can identify the position of the priority vehicle 500.

In step ST23, the processor 101 identifies the place where the roadside unit 400 is installed where the priority vehicle 500 passes through when this vehicle travels on the travel route, based on the travel route and the position of each roadside unit 400. Note that the place where the roadside unit 400 is installed is hereinafter called "roadside unit installation place". The processor 101 acquires the roadside unit installation place from the auxiliary storage device 104, for example. The roadside unit installation place is a place as indicated by the following (1) to (4).

(1) A point or range preliminarily defined as a place installed with the roadside unit 400. For example, the point or the range is preliminarily defined based on the installation position of the roadside unit 400 and is typically a road or the like around the position installed with the roadside unit 400.

(2) A range where the distance from the roadside unit 400 is within a predetermined distance.

(3) A range where the reception intensity of communication between the priority vehicle 500 and the roadside unit 400 is equal to or higher than a predetermined intensity.

(4) A range allowing the priority vehicle 500 and the roadside unit 400 to communicate with each other.

In step ST23, the processor 101 acquires an estimated time when the priority vehicle 500 passes through each roadside unit installation place (hereinafter called "estimated time of passage"). For example, the processor 101 acquires the estimated time of passage by determining the estimated time of passage based on the travel route acquired in step ST22. For example, the processor 101 determines the estimated time of passage using the distance (distance along the route) from the priority vehicle 500 to each roadside unit installation place or that to the roadside unit 400 installed at each roadside unit installation place, the average speed of the priority vehicle 500, the congestion state on the travel route and the like. The processor 101 may determine the estimated time of passage using machine learning, AI (artificial intelligence) or the like. For example, the processor 101 performs machine learning using travel history data on past emergency traveling of the priority vehicle 500 and determines the estimated time of passage by determining a required travel time period from the departure point to each roadside unit installation place or each roadside unit 400, based on the result of the machine learning. Note that the processor 101 may periodically acquire again the estimated time of passage depending on the latest current position of the priority vehicle 500. Note that the processor 511 of the vehicle-mounted apparatus 510 may determine the estimated time of passage. In this case, the processor 101 of the server apparatus 100 acquires the estimated time of passage from the vehicle-mounted apparatus 510.

In step ST24, the processor 101 determines whether to issue an instruction for starting the priority control or not. The processor 101 determines, for each roadside unit 400, whether the time has been a predetermined time period T1 before the estimated time of passage (hereinafter called "priority control start time") or not. If the priority control start time has come for any roadside unit 400, the processor 101 determines to issue an instruction for starting priority control. On the other hand, if the priority control start time didn't come for all roadside unit 400, the processor 101 does not determine to issue an instruction for starting priority control. If the processor 101 does not determine to issue an instruction for starting priority control, the processor 101 determines No in step ST24 and proceeds the processing to step ST25. Note that the time period T1 is an example of the first predetermined time period.

In step ST25, the processor 101 determines whether to issue an instruction for finishing the priority control or not. The processor 101 determines, for each roadside unit 400, whether the time has been a predetermined time period T2 after the estimated time of passage (hereinafter called "priority control finish time") or not. If the priority control finish time has come for any roadside unit 400, the processor 101 determines to issue an instruction for finishing the priority control. On the other hand, if the priority control finish time didn't come for all roadside unit 400, the processor 101 does not determine to issue an instruction for finishing the priority control. If the processor 101 does not determine to issue an instruction for finishing priority control, the processor 101 determines No in step ST25 and proceeds the processing to step ST26. Note that the predetermined time period T2 is an example of the second predetermined time period.

In step ST26, the processor 101 determines whether the priority vehicle 500 has arrived at the destination or not. For example, based on the position information on the priority vehicle 500, the processor 101 determines whether this vehicle has arrived at the destination or not. Alternatively, upon receipt of information indicating the arrival at the destination from the priority vehicle 500, the processor 101 determines that the priority vehicle 500 has arrived at the destination. If the priority vehicle 500 has not arrived at the destination yet, the processor 101 determines No in step ST26 and returns the processing to step ST24. Thus, the processor 101 comes into a standby state of repeating steps ST24 to ST26 until the processor 101 determines to issue an instruction for starting priority control, to issue an instruction for finishing the priority control or the priority vehicle 500 arrives at the destination.

If the processor 101 determines to issue an instruction for starting priority control in the standby state in steps ST24 to ST26, the processor 101 determines Yes in step ST24 and proceeds the processing to step ST27. In step ST27, the processor 101 generates first priority information and second priority information. The first priority information is information indicating an instruction for starting priority control and emergency notification. The second priority information is information indicating an instruction for starting priority control. Note that the second priority information includes at least one selected from a terminator apparatus ID (identifier) of the terminator apparatus 300 connected to the roadside unit 400 of which the priority control start time has come and an LLID of the line L used by the priority vehicle 500 for communications. The terminator apparatus ID is identification information uniquely assigned to a corresponding terminator apparatus 300. The LLID is identification information uniquely assigned to a corresponding to each of multiple lines included in the line L. Here, the plurality of lines included in the line L are virtual lines, for example. Each terminator apparatus 300 includes one or more LLIDs. The terminator apparatus 300 communicates with the terminator apparatus 200 using a different line for each LLID among LLIDs that the terminator apparatus 300 has. For example, the terminator apparatus 300 uses a line with a first LLID for communications with the priority vehicle 500 and uses a line with a second LLID for the other communications.

The priority control is control that prioritizes the communications with the priority vehicle 500 over the other communications, by QoS (quality of service) or the like. The other communications include, for example, transmission and reception of traffic information and entertainment information by the vehicle 600. Communications that are priority control targets are some or all of those on a communication path between the server apparatus 100 and the priority vehicle 500. The communications that are priority control targets are, for example, at least any of a wireless communication between the second communication I/F 406 of the roadside unit 400 and each apparatus, a communication using the line L between the terminator apparatus 300 and the terminator apparatus 200, a communication between the terminator apparatus 200 and the server apparatus 100 and a wireless communication between the priority vehicle 500 and the network NW2. When the processor 101 targets the wireless communication between the second communication I/F 406 of the roadside unit 400 and each apparatus for the priority control, the processor 101 instructs the roadside unit 400 to perform priority control, for example. When the processor 101 targets the communication using the line L for the priority control, the processor 101 instructs the terminator apparatus 200 to perform priority control, for example. When the processor 101 targets the communication between the terminator apparatus 200 and the server apparatus 100 for the priority control target, the processor 101 instructs the network equipment on the path from the terminator apparatus 200 to the server apparatus 100 to perform priority control. The network equipment is, for example, equipment in the network NW2. The network equipment is, for example, a router. The instructed network equipment prioritizes the communication with the priority vehicle 500. When the processor 101 targets the communication between the terminator apparatus 200 and the server apparatus 100 for the priority control target, the processor 101 prioritizes the communication with the priority vehicle 500 by controlling the communication I/F 105. When the processor 101 targets the wireless communication between the priority vehicle 500 and the network NW2 for the priority control target, the processor 101 instructs an access point or a base station of the wireless communication to perform priority control, for example. The instructed access point, base station or the like prioritizes the communication with the priority vehicle 500. Emergency notification is notification to neighboring entities about passage of the priority vehicle 500 through an intersection or the like.

After generation of the first priority information, the processor 101 instructs the communication I/F 105 to transmit the first priority information to the roadside unit 400 of which the priority control start time has come. Upon receipt of the instruction for transmission, the communication I/F 105 transmits the first priority information to the roadside unit 400. The transmitted first priority information is received by the first communication I/F 405 of the roadside unit 400. After generation of the second priority information, the processor 101 instructs the communication I/F 105 to transmit the second priority information to the terminator apparatus 200 on the communication path to the roadside unit 400 of which the priority control start time has come. Upon receipt of the instruction for transmission, the communication I/F 105 transmits the second priority information to the terminator apparatus 200. The transmitted second priority information is received by the first communication I/F 205 of the terminator apparatus 200. After generation of the second priority information, the processor 101 instructs the communication I/F 105 to transmit the second priority information to a piece of network equipment to which the processor 101 intends to apply priority control among pieces of network equipment on the communication path to the roadside unit 400 of which the priority control start time has come. Upon receipt of the instruction for transmission, the communication I/F 105 transmits the second priority information to this piece of network equipment. The network equipment having received the second priority information starts the priority control. After the process of ST27, the processor 101 returns the processing to step ST24. The processor 101 performs the process of step ST27 to cooperate with the communication I/F 105 and serve as an example of a controller that when the priority vehicle 500 passes through the place where road side unit 400 is installed, the controller issues an instructs for executing priority control to the roadside unit.

If the processor 101 determines to issue an instruction for finishing the priority control in the standby state in steps ST24 to ST26, the processor 101 determines Yes in step ST25 and proceeds the processing to step ST28. In step ST28, the processor 101 generates first finish information and second finish information. The first finish information is information indicating an instruction for finishing priority control and emergency notification. The second finish information is information indicating an instruction for finishing the priority control. Note that the second finish information includes the terminator apparatus ID of the terminator apparatus 300 connected to the roadside unit 400 of which the priority control finish time has come.

After generation of the first finish information, the processor 101 instructs the communication I/F 105 to transmit the first finish information to the roadside unit 400 of which the priority control finish has come. Upon receipt of the instruction for transmission, the communication I/F 105 transmits the first finish information to the roadside unit 400. The transmitted first finish information is received by the first communication I/F 405 of the roadside unit 400. After generation of the second finish information, the processor 101 instructs the communication I/F 105 to transmit the second finish information to the terminator apparatus 200 on the communication path to the roadside unit 400 of which the priority control finish time has come. Upon receipt of the instruction for transmission, the communication I/F 105 transmits the second finish information to the terminator apparatus 200. The transmitted second finish information is received by the first communication I/F 205 of the terminator apparatus 200. After generation of the second finish information, the processor 101 instructs the communication I/F 105 to transmit the second finish information to the piece of network equipment for which the processor 101 intends to finish the priority control among pieces of network equipment on the communication path to the roadside unit 400 of which the priority control finish time has come. Upon receipt of the instruction for transmission, the communication I/F 105 transmits the second finish information to this piece of network equipment. The network equipment having received the second finish information finishes the priority control. After the process of ST28, the processor 101 returns the processing to step ST24.

When the priority vehicle 500 arrives at the destination in the standby state in steps ST24 to ST26, the processor 101 determines Yes in step ST26 and returns the processing to step ST21.

On the other hand, in step ST31 of FIG. 10, the processor 401 of the roadside unit 400 waits for reception of the first priority information by the communication I/F 105. Upon receipt of the first priority information, the processor 401 determines Yes in step ST31 and proceeds the processing to step ST32.

In step ST32, the processor 401 starts the priority control. That is, the processor 401 controls the communication with the priority vehicle 500 in a prioritized manner. For example, the processor 401 prioritizes the communication with the priority vehicle 500 by applying band limitation or delaying or stopping communications other than the communication with the priority vehicle 500. Alternatively, the processor 401 prioritizes the communication with the priority vehicle 500 by limiting the amount of network resources usable by the communications other than the communication with the priority vehicle 500, through network slicing or the like. Note that the processor 401 discriminates whether the communication is the communication with the priority vehicle 500 or a communication other than that with the priority vehicle 500, by information for identification, such as an identifier, included in a communication packet, for example. Alternatively, the processor 401 may discriminate the communication with the priority vehicle 500 from communications other than the communication with the priority vehicle 500, by discriminating channels (frequencies) for the communication with the priority vehicle 500 and communications other than the communication with the priority vehicle 500. Note that the communication with the priority vehicle 500 is an example of the first communication. The communication other than that with the priority vehicle 500 is an example of the second communication.

In step ST33, the processor 401 instructs the second communication I/F 406 to transmit emergency notification information to the neighboring vehicle-mounted apparatus 610, terminal apparatus 900 and the like. Here, "neighboring" indicates a range allowing wireless communications with the roadside unit 400, for example. The emergency notification information is information for notification about passage of the priority vehicle 500 through an intersection or the like. The emergency notification information includes, for example, information indicating the position of the priority vehicle 500. Upon receipt of the instruction for transmission, the second communication I/F 406 transmits the emergency notification information to the neighboring vehicle-mounted apparatus 610 and terminal apparatus 900. The transmitted emergency notification information is received by the communication I/F 615 of the vehicle-mounted apparatus 610 and the communication I/F 905 of the terminal apparatus 900.

On the other hand, in step ST41 of FIG. 11, the processor 611 of the vehicle-mounted apparatus 610 waits for reception of the emergency notification information by the communication I/F 615. Upon receipt of the emergency notification information, the processor 611 determines Yes in step ST41 and proceeds the processing to step ST42.

In step ST42, the processor 611 notifies a person in the vehicle 600, such as a driver of the vehicle 600, that the priority vehicle 500 is approaching. For example, the processor 611 controls the display device 616 to display a screen indicating the fact that the priority vehicle 500 is approaching such as "An ambulance is approaching from a place xx meters away" or "An emergency vehicle is approaching". Note that characters are a type of image. The processor 611 controls the speaker 617 to output a sound indicating that the priority vehicle 500 is approaching. The processor 611 may have a configuration that outputs the sound while displaying the image.

In step ST43, the processor 611 may control the drive system of the vehicle 600 depending on the situation, decelerate, stop the vehicle 600 or pull over the vehicle 600 on the end of the road. After the process of ST43, the processor 611 returns the processing to step ST41.

On the other hand, in step ST51 of FIG. 12, the processor 901 of the terminal apparatus 900 waits for reception of the emergency notification information by the communication I/F 905. Upon receipt of the emergency notification information, the processor 901 determines Yes in step ST51 and proceeds the processing to step ST52.

In step ST52, the processor 901 notifies a person carrying the terminal apparatus 900 that the priority vehicle 500 is approaching. For example, the processor 901 controls the touchscreen 906 to display an image indicating the fact that the priority vehicle 500 is approaching such as "An ambulance is approaching from a place xx meters away" or "An emergency vehicle is approaching". The processor 901 controls the speaker 907 to output a sound indicating that the priority vehicle 500 is approaching. The processor 901 vibrates the vibrator 908. After the process of ST52, the processor 901 returns the processing to step ST51.

On the other hand, in step ST34 of FIG. 10, the processor 401 of the roadside unit 400 controls the traffic light 700 to allow the priority vehicle 500 to easily pass. For example, the processor 401 brings all the traffic lights 700 at the intersections installed with the roadside units 400 or around the roadside units 400 into a lighting state that means stop. The lighting state that means stop is a state where red light is on, for example. Alternatively, the processor 401 brings only the traffic lights 700 in the traveling direction of the priority vehicle 500 among the traffic lights 700 at the intersections installed with the roadside units 400 or around the roadside units 400 into a lighting state that means traveling and brings the other traffic lights 700 into the lighting state that means stop. Note that the lighting state that means traveling is a state where blue (green) light is on, for example.

In step ST35, the processor 401 controls the road display apparatus 800 to display an image indicating that the priority vehicle 500 is approaching.

In step ST36, the processor 401 waits for reception of the first finish information by the first communication I/F 405. Upon receipt of the first finish information, the processor 401 determines Yes in step ST36 and proceeds the processing to step ST37.

In step ST37, the processor 401 finishes the priority control and the emergency notification. That is, the processor 401 finishes the priority control started in step ST32. The processor 401 finishes the control performed in steps ST34 and ST35 and returns the operations of the traffic lights 700 and the road display apparatus 800 to normal operations. After the process of ST37, the processor 401 returns the processing to step ST31.

On the other hand, in step ST61 of FIG. 13, the processor 201 of the terminator apparatus 200 determines whether the second priority information has been received by the first communication I/F 205 or not. If the second priority information has not been received yet, the processor 201 determines No in step ST61 and proceeds the processing to step ST62.

In step ST62, the processor 201 determines whether the second finish information has been received by the first communication I/F 205 or not. If the second finish information has not been received yet, the processor 201 determines No in step ST62 and returns the processing to step ST61. Thus, the processor 201 comes into a standby state of repeating steps ST61 and ST62 until the second priority information or the second finish information is received.

When the second priority information is received in the standby state in steps ST61 and ST62, the processor 201 determines Yes in step ST61 and proceeds the processing to step ST63.

In step ST63, the processor 201 starts priority control that targets the line with the same LLID as the LLID included in second start information (hereinafter called "priority target line"). That is, the processor 201 prioritizes the communication with the priority vehicle 500 by prioritizing the communication on the priority target line. For example, the processor 201 prioritizes the priority target line by applying band limitation or delaying or stopping communications using the line L other than the priority target line. Alternatively, the processor 201 prioritizes the communication on the priority target line by limiting the amount of network resources usable by the communications other than the communication on the priority target line, through network slicing or the like. Note that when the processor 201, in a state of priority control targeting a line with a specific LLID, receives the second start information targeting a line with another LLID, the processor 201 adopts both the lines with the LLIDs as priority control targets. This similarly applies to a case of prioritizing three or more lines. In step ST63, the processor 201 starts priority control targeting the terminator apparatus 300 having the same terminator apparatus ID as the terminator apparatus ID included in the second start information or the terminator apparatus 300 having the LLID included in the second start information. Note that "the terminator apparatus 300 having the same terminator apparatus ID as the terminator apparatus ID included in the second start information or the terminator apparatus 300 having the LLID included in the second start information" is hereinafter called "priority target terminator apparatus". That is, the processor 201 prioritizes the communication with the priority vehicle 500 by prioritizing the communication with the priority target terminator apparatus. For example, the processor 201 prioritizes the communication with the priority target terminator apparatus by applying band limitation or delaying or stopping communications with terminator apparatuses 300 other than the priority target terminator apparatus. Alternatively, the processor 201 prioritizes the communication with the priority target terminator apparatus by limiting the amount of network resources usable by the communications other than the communication with the priority target terminator apparatus, through network slicing. Note that when the processor 201, in a state of priority control targeting a specific terminator apparatus 300, receives the second start information targeting another terminator apparatus 300, the processor 201 adopts both the terminator apparatuses 300 as priority control targets. This similarly applies to a case of prioritizing three or more apparatuses. After the process of ST63, the processor 201 returns the processing to step ST61.

When the second finish information is received in the standby state in steps ST61 and ST62, the processor 201 determines Yes in step ST62 and proceeds the processing to step ST64. In step ST64, the processor 201 finishes priority control targeting the terminator apparatus 300 having the same terminator apparatus ID as the terminator apparatus ID included in the second finish information. After the process of ST64, the processor 201 returns the processing to step ST61.

When the priority vehicle 500 passes through the roadside unit installation place, the communication system 1 in the embodiment prioritizes the communication with the priority vehicle 500. Accordingly, the communication system 1 can provide the priority vehicle 500 with a stable communication service resistant to causing congestion. The priority vehicle 500 can transmit and receive information having a high urgency, using such stable communication. The communication system 1 prioritizes the communication with the priority vehicle 500, which can provide the priority vehicle 500 with a communication service at a high speed in comparison with a case without prioritizing.

The communication system 1 in the embodiment transmits the emergency notification indicating that the priority vehicle 500 is approaching, to the vehicle-mounted apparatus 610 of the vehicle 600, the terminal apparatus 900 and the like. Accordingly, a person in the vehicle 600 and a person carrying the terminal apparatus 900 can know that the priority vehicle 500 is approaching even if he or she does not hear a siren of the priority vehicle 500. Accordingly, the priority vehicle 500 is not required to sound the siren.

The communication system 1 in the embodiment identifies the roadside unit 400 where the priority vehicle passes, from the travel route of the priority vehicle 500 and the position of the roadside unit 400. Accordingly, before the priority vehicle 500 approaches, the communication system 1 in the embodiment can notify each roadside unit 400 that the priority vehicle 500 will pass through the intersection or the like.

According to the communication system 1 in the embodiment, the server apparatus 100 issues an instruction for starting priority control at a time obtained by subtracting the time period T1 from the estimated time at which the priority vehicle 500 passes through the roadside unit installation place. Accordingly, the communication system 1 can start the priority control at appropriate timing.

According to the communication system 1 in the embodiment, the server apparatus 100 issues an instruction for finishing the priority control at a time obtained by adding the time period T2 to the estimated time at which the priority vehicle 500 passes through the roadside unit installation place. Accordingly, the communication system 1 can finish the priority control at appropriate timing.

The communication system 1 in the embodiment acquires the estimated time again, which can perform the priority control, based on the latest position of the priority vehicle 500.

When the priority vehicle 500 passes through the roadside unit installation place, the communication system 1 in the embodiment controls the traffic light 700. Accordingly, the communication system 1 in the embodiment allows the priority vehicle 500 to easily pass.

The communication system 1 in the embodiment sets the communication channel used by the priority vehicle 500 and the communication channel used by another vehicle to channels different from each other. Such a configuration can easily prioritize the communication with the priority vehicle 500.

The embodiment described above can be modified as described below. In the embodiment described above, the processor 401 of the roadside unit 400 starts the priority control and the emergency notification upon receipt of the first priority information. However, the processor 401 may start the priority control and the emergency notification if a predetermined condition is satisfied after receipt of the first priority information. In this case, the processor 101 of the server apparatus 100 transmits the first priority information to the roadside unit 400 before the priority control start time. The first priority information includes the estimated time of passage about the roadside unit 400 that is the transmission destination of the first priority information, for example. Note that the processor 101 may transmit the first priority information to a plurality of roadside units 400 at one time. The processor 101 may regenerate the first priority information in response to acquiring again the travel route or the estimated time of passage and transmit again the regenerated first priority information to the roadside unit 400 to which the previous first priority information has already been transmitted. The processor 401 of the roadside unit 400 performs the processes, based on the latest first priority information. On the other hand, the processor 401 of the roadside unit 400 having received the first priority information determines whether to start the priority control and the emergency notification after step ST31. For example, if the current time is on or after a time before the predetermined time period T1 from the estimated time of passage, the processor 401 determines to start the priority control and the emergency notification. Alternatively, the processor 401 determines to start the priority control and the emergency notification, in response to the priority vehicle 500 approaching the roadside unit 400. For example, the processor 401 assumes that the priority vehicle 500 approaches when the reception intensity of the communication between the roadside unit 400 and the priority vehicle 500 becomes a predetermined intensity P1 or higher. The processor 401 repeats the determination process of whether to start the priority control and the emergency notification until determination to start the priority control and the emergency notification. If the processor 401 determines to start the priority control and the emergency notification, the processing proceeds to step ST32. Such a configuration allows the roadside unit 400 to start the priority control at appropriate timing.

When the priority vehicle 500 approaches the roadside unit 400, the processor 401 of the roadside unit 400 may transmit, to the server apparatus 100, information indicating that the priority vehicle 500 approaches the roadside unit 400. Upon receipt of the information, the processor 101 of the server apparatus 100 may then transmit the first priority information and the second priority information.

The processor 101 of the server apparatus 100 may determine that the priority vehicle 500 approaches the roadside unit 400 by acquiring the position information on the priority vehicle 500. For example, when the distance between the position of the priority vehicle 500 and the installation position of the roadside unit 400 becomes within a predetermined distance D1, the processor 401 assumes that the priority vehicle 500 approaches. If the processor 101 of the server apparatus 100 determines that the priority vehicle 500 approaches the roadside unit 400, the processor 101 transmits the first priority information and the second priority information. The distance D1 is an example of the first predetermined distance.

In the embodiment described above, the processor 401 of the roadside unit 400 finishes the priority control and the emergency notification upon receipt of the first finish information. However, the processor 401 may finish the priority control and the emergency notification if another condition is satisfied. For example, if the current time is on or after a time after the predetermined time period T2 from the estimated time of passage, the processor 401 determines to finish the priority control and the emergency notification. For example, the processor 401 finishes the priority control and the emergency notification in response to completion of passage of the priority vehicle 500 through the roadside unit installation place installed with the roadside unit 400 that includes this processor 401. For example, the processor 401 assumes that the priority vehicle 500 has passed through the roadside unit installation place when the reception intensity of the communication between the roadside unit 400 and the priority vehicle 500 becomes a predetermined intensity P2 or lower. Such a configuration allows the roadside unit 400 to finish the priority control at appropriate timing.

If the priority vehicle 500 has passed through the roadside unit installation place installed with the roadside unit 400, the processor 401 of the roadside unit 400 may transmit, to the server apparatus 100, information indicating that the priority vehicle 500 has passed. Upon receipt of the information, the processor 101 of the server apparatus 100 may then transmit the first finish information and the second finish information.

The processor 101 of the server apparatus 100 may determine that the priority vehicle 500 has passed through the roadside unit installation place installed with the roadside unit 400, by acquiring the position information on the priority vehicle 500. For example, when the distance between the position of the priority vehicle 500 and the installation position of the roadside unit 400 becomes equal to or larger than a predetermined distance D2, the processor 401 assumes that the priority vehicle 500 has passed. If the processor 101 of the server apparatus 100 determines that the priority vehicle 500 has passed, the processor 101 transmits the first finish information and the second finish information. The distance D2 is an example of the second predetermined distance.

When the priority vehicle 500 approaches the roadside unit 400, the processor 401 of the roadside unit 400 may transmit, to the server apparatus 100, information indicating that the priority vehicle 500 approaches the roadside unit 400. Upon receipt of the information, the processor 101 of the server apparatus 100 may then transmit the first priority information and the second priority information.

In the embodiment described above, the processor 301 of the terminator apparatus 300 finishes the priority control upon receipt of the second finish information. However, the processor 301 may finish the priority control if another condition is satisfied. For example, if the current time is on or after a time after the predetermined time period T2 from the estimated time of passage of the priority target terminator apparatus, the processor 301 finishes the priority control targeting the priority target terminator apparatus.

When the priority vehicle 500 passes on a route other than the travel route, the communication system 1 may acquire the travel route again. In this case, the processor 101 of the server apparatus 100 acquires the travel route and performs the processes of steps ST23 to ST28, based on the travel route. Note that if there is a roadside unit 400 through which passage was scheduled on the travel route before the travel route is acquired again but through which passage is not scheduled on the travel route after the travel route is acquired again, the processor 101 may transmit stop information to this roadside unit 400 via the communication I/F 105. The stop information is information indicating stop of the priority control and the emergency notification. During priority control, the processor 401 of the roadside unit 400 having received the stop information finishes the priority control. Before priority control is started, the processor 401 of the roadside unit 400 having received the stop information does not start the priority control.

The processor 101, the processor 401, the processor 511, the processor 611 or the processor 901 may achieve some or all of the processes achieved by programs in the embodiments described above, through a hardware configuration of circuits.

The programs that achieve the processes in the embodiments are handed over in a state of being stored in each of apparatuses. However, each of the apparatuses may be handed over in a state where the programs are not stored. The programs may then be separately handed over and written in each of the apparatuses. Handing over of the programs at this time may be achieved by, for example, being stored in a removable storage medium or by download via a network, such as the Internet or a LAN.

The embodiments of the present invention are described above but are described as examples and do not limit the scope of the present invention. The embodiments of the present invention can be implemented in various embodiments in a range without departing from the gist of the present invention.

EXPLANATION OF REFERENCE NUMERALS

1 Communication system
100 Server apparatus
101, 201, 401, 511, 611, 901 Processor
102, 202, 402, 512, 612, 902 ROM
103, 203, 403, 513, 613, 903 RAM
104, 204, 404, 514, 614, 904 Auxiliary storage device
105, 615, 905 Communication I/F
106, 207, 409, 520, 618, 909 Bus
200, 300 Terminator apparatus
205, 405, 515 First communication I/F
206, 406, 516 Second communication I/F
400 Roadside unit
407 Control I/F
408, 519 GNSS antenna
500 Priority vehicle
510, 610 Vehicle-mounted apparatus
517, 616 Display device
518, 617, 907 Speaker
600 Vehicle
700 Traffic light
800 Road display apparatus
900 Terminal apparatus
906 Touchscreen
908 Vibrator

The invention claimed is:

1. A communication system comprising a server apparatus, the server apparatus comprising:
a controller that issues an instruction for executing priority control when a priority vehicle passes through a place where a roadside unit is installed, the priority control prioritizing a first communication performed by the priority vehicle via the roadside unit over a second communication performed by anything other than the priority vehicle via the roadside unit, wherein when the priority vehicle passes through the place, the controller issues an instruction for executing the priority control to the roadside unit, and
upon receipt of the instruction for executing the priority control from the server apparatus, the roadside unit performs the priority control.

2. A communication system comprising a server apparatus, the server apparatus comprising:
a controller that issues an instruction for executing priority control when a priority vehicle passes through a place where a roadside unit is installed, the priority control prioritizing a first communication performed by the priority vehicle via the roadside unit over a second communication performed by anything other than the priority vehicle via the roadside unit,
wherein when the priority vehicle passes through the place, the controller issues an instruction for executing the priority control to a priority-controllable communication network between the server apparatus and the roadside unit, and
upon receipt of the instruction for executing the priority control from the server apparatus, the communication network performs the priority control.

3. The communication system according to claim 2, wherein the communication network includes a PON (passive optical network) access system that includes an OLT (optical line terminal) and an ONU (optical network unit).

4. The communication system according to claim 2, wherein the communication network includes a PON (passive optical network) access system that includes a WAN (wide area network) communication network, an OLT (optical line terminal) and an ONU (optical network unit).

5. The communication system according to claim 1, wherein when the priority vehicle passes through the place, the roadside unit transmits information indicating that the priority vehicle is approaching, to an apparatus around the roadside unit.

6. The communication system according to claim 1, wherein the controller identifies the roadside unit installed at the place where the priority vehicle passes, based on a route where the priority vehicle is scheduled to pass and on an installation position of the roadside unit, and controls the identified roadside unit to perform the priority control.

7. The communication system according to claim 1, wherein the controller issues an instruction for executing the priority control a first predetermined time period before an estimated time at which the priority vehicle is estimated to pass through the place.

8. The communication system according to claim 1, wherein the controller issues an instruction for finishing the priority control a second predetermined time period after an estimated time at which the priority vehicle is estimated to pass through the place.

9. The communication system according to claim 7, wherein the controller acquires the estimated time, based on a result of machine learning using past traveling data.

10. The communication system according to claim 1, wherein when a distance between the priority vehicle and the roadside unit becomes equal to or less than a first predetermined distance, the controller issues an instruction for executing the priority control.

11. The communication system according to claim 1, wherein when the priority vehicle moves a second predetermined distance or more away from the roadside unit, the roadside unit issues an instruction for finishing the priority control.

12. The communication system according to claim 1, wherein when the priority vehicle passes around the roadside unit, the roadside unit controls a traffic light.

13. The communication system according to claim 1, wherein the roadside unit causes a channel used for the first communication and a channel used for the second communication to be different channels, and performs the priority control by controlling communication on the channel used for the first communication to be prioritized.

14. A server apparatus comprising a controller that issues an instruction for executing priority control when a priority vehicle passes through a place where a roadside unit is installed, the priority control prioritizing a first communication performed by the priority vehicle via the roadside unit over a second communication performed by anything other than the priority vehicle via the roadside unit, wherein when the priority vehicle passes through the place, the controller issues an instruction for executing the priority control to the roadside unit, and
upon receipt of the instruction for executing the priority control from the server apparatus, the roadside unit performs the priority control.

15. A non-transitory computer readable medium storing a program causing a processor included in a server apparatus to function as a controller, the controller issuing an instruction for executing priority control when a priority vehicle passes through a place where a roadside unit is installed, the priority control prioritizing a first communication performed by the priority vehicle via the roadside unit over a second communication performed by anything other than the priority vehicle via the roadside unit, wherein when the priority vehicle passes through the place, the controller issues an instruction for executing the priority control to the roadside unit, and upon receipt of the instruction for executing the priority control from the server apparatus, the roadside unit performs the priority control.

16. A communication method of issuing an instruction for executing priority control when a priority vehicle passes around a roadside unit, the priority control prioritizing a first communication performed by the priority vehicle via the roadside unit over a second communication performed by anything other than the priority vehicle via the roadside unit, wherein when the priority vehicle passes through the place, the controller issues an instruction for executing the priority control to the roadside unit, and upon receipt of the instruction for executing the priority control from the server apparatus, the roadside unit performs the priority control.

17. A server apparatus comprising a controller that issues an instruction for executing priority control when a priority vehicle passes through a place where a roadside unit is installed, the priority control prioritizing a first communication performed by the priority vehicle via the roadside unit over a second communication performed by anything other than the priority vehicle via the roadside unit, wherein when the priority vehicle passes through the place, the controller issues an instruction for executing the priority control to a priority-controllable communication network between the server apparatus and the roadside unit, and upon receipt of the instruction for executing the priority control from the server apparatus, the communication network performs the priority control.

18. A non-transitory computer readable medium storing a program causing a processor included in a server apparatus to function as a controller, the controller issuing an instruction for executing priority control when a priority vehicle passes through a place where a roadside unit is installed, the priority control prioritizing a first communication performed by the priority vehicle via the roadside unit over a second communication performed by anything other than the priority vehicle via the roadside unit, wherein when the priority vehicle passes through the place, the controller issues an instruction for executing the priority control to a priority-controllable communication network between the server apparatus and the roadside unit, and upon receipt of the instruction for executing the priority control from the server apparatus, the communication network performs the priority control.

19. A communication method of issuing an instruction for executing priority control when a priority vehicle passes around a roadside unit, the priority control prioritizing a first communication performed by the priority vehicle via the roadside unit over a second communication performed by anything other than the priority vehicle via the roadside unit wherein when the priority vehicle passes through the place, the controller issues an instruction for executing the priority control to a priority-controllable communication network between the server apparatus and the roadside unit, and upon receipt of the instruction for executing the priority control from the server apparatus, the communication network performs the priority control.

* * * * *